(12) United States Patent
Clark et al.

(10) Patent No.: US 7,357,667 B2
(45) Date of Patent: Apr. 15, 2008

(54) TELECOMMUNICATIONS PATCH

(75) Inventors: Gordon P. Clark, Eden Prairie, MN (US); Loren Mattson, Richfield, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 11/472,816

(22) Filed: Jun. 22, 2006

(65) Prior Publication Data

US 2007/0298652 A1 Dec. 27, 2007

(51) Int. Cl.
*H01R 13/60* (2006.01)
(52) U.S. Cl. .................................... 439/540.1
(58) Field of Classification Search ............ 439/540.1, 439/534, 731, 541.5; 361/428, 429; 385/135, 385/134; 29/68; 174/50
See application file for complete search history.

(56) References Cited

U.S. PATENT DOCUMENTS

| | | |
|---|---|---|
| 1,616,114 A | 2/1927 | Curran et al. |
| 2,317,450 A | 4/1943 | Folds et al. |
| 2,427,349 A | 9/1947 | Boynton |
| 3,337,059 A | 8/1967 | Le Hoy |
| 3,611,264 A | 10/1971 | Ellis, Jr. |
| 3,915,541 A | 10/1975 | Flegel |
| 3,953,100 A | 4/1976 | Feeney |
| 3,958,850 A | 5/1976 | Ayer |
| 4,085,992 A | 4/1978 | Ayer |
| D247,965 S | 5/1978 | Gray |
| 4,131,330 A | 12/1978 | Stupay |
| D271,965 S | 12/1983 | Hollfelder |
| 4,536,052 A | 8/1985 | Baker et al. |
| 4,747,020 A | 5/1988 | Brickley et al. |
| 4,815,104 A | 3/1989 | Williams et al. |
| 4,824,196 A * | 4/1989 | Bylander ............. 385/134 |
| 4,995,688 A | 2/1991 | Anton et al. |
| 5,000,703 A | 3/1991 | Biederstedt et al. |
| 5,011,257 A | 4/1991 | Wettengel et al. |
| 5,127,082 A | 6/1992 | Below et al. |
| 5,129,842 A | 7/1992 | Morgan et al. |
| 5,139,445 A | 8/1992 | Below et al. |
| 5,178,554 A | 1/1993 | Siemon et al. |
| 5,238,426 A | 8/1993 | Arnett |

(Continued)

FOREIGN PATENT DOCUMENTS

EP  0 736 937 A1  10/1996

OTHER PUBLICATIONS

DP6 Plus Angled Patch Panel Customer Drawing, dated Mar. 18, 2003, 1 page.

(Continued)

*Primary Examiner*—Alexander Gilman
(74) *Attorney, Agent, or Firm*—Merchant & Gould P.C.

(57) ABSTRACT

A connecting panel assembly including pivot modules that are pivotally connected to a frame of the assembly. The pivot modules include a plurality of jack modules. The jack modules have a plug opening on one side and wire terminations on an opposite side. The pivot modules are pivotally coupled at opposite ends of the frame. The pivot modules can pivot from a closed position wherein the pivot modules are aligned parallel with the frame, and an open angled position wherein the pivot modules are positioned at an angled position relative to the frame. The assembly also includes a support member that supports the pivot modules in the angled position.

20 Claims, 20 Drawing Sheets

U.S. PATENT DOCUMENTS

| | | | |
|---|---|---|---|
| 5,299,956 | A | 4/1994 | Brownell et al. |
| 5,302,140 | A | 4/1994 | Arnett |
| 5,303,519 | A | 4/1994 | Mustee et al. |
| 5,310,363 | A | 5/1994 | Brownell et al. |
| 5,370,541 | A | 12/1994 | Bossard |
| 5,370,553 | A | 12/1994 | Zimmerman |
| RE34,955 | E | 5/1995 | Anton et al. |
| 5,412,751 | A | 5/1995 | Siemon et al. |
| 5,415,296 | A | 5/1995 | Wright |
| D367,037 | S | 2/1996 | Fladung et al. |
| 5,530,954 | A | 6/1996 | Larson et al. |
| 5,575,665 | A | 11/1996 | Shramawick et al. |
| 5,591,045 | A | 1/1997 | Pepe et al. |
| 5,639,261 | A | 6/1997 | Rutkowski et al. |
| 5,645,449 | A | 7/1997 | Sabo |
| 5,659,650 | A | 8/1997 | Arnett |
| 5,674,093 | A | 10/1997 | Vaden |
| 5,676,566 | A | 10/1997 | Carlson |
| 5,700,167 | A | 12/1997 | Pharney et al. |
| 5,721,394 | A | 2/1998 | Mulks |
| 5,734,776 | A * | 3/1998 | Puetz ................... 385/134 |
| 5,735,714 | A | 4/1998 | Orlando et al. |
| 5,788,087 | A | 8/1998 | Orlando |
| 5,836,786 | A | 11/1998 | Pepe |
| 5,888,079 | A | 3/1999 | Norden |
| 5,921,402 | A | 7/1999 | Magenheimer |
| 5,944,535 | A | 8/1999 | Bullivant et al. |
| 5,945,633 | A | 8/1999 | Ott et al. |
| 5,947,765 | A | 9/1999 | Carlson, Jr. et al. |
| 5,956,449 | A | 9/1999 | Otani et al. |
| 5,969,294 | A | 10/1999 | Eberle et al. |
| 5,984,720 | A * | 11/1999 | Milner et al. ............ 439/534 |
| 5,993,251 | A | 11/1999 | Brown et al. |
| 6,146,192 | A | 11/2000 | Cabalka et al. |
| 6,200,159 | B1 | 3/2001 | Chou |
| 6,208,796 | B1 | 3/2001 | Vigliaturo |
| 6,231,380 | B1 | 5/2001 | Cabalka et al. |
| 6,236,795 | B1 | 5/2001 | Rodgers |
| 6,240,234 | B1 | 5/2001 | Falkenberg et al. |
| 6,242,698 | B1 | 6/2001 | Baker, III et al. |
| 6,259,852 | B1 | 7/2001 | Daoud et al. |
| 6,293,707 | B1 | 9/2001 | Wild |
| RE37,489 | E | 1/2002 | Anton et al. |
| 6,350,148 | B1 | 2/2002 | Bartolutti et al. |
| 6,468,112 | B1 | 10/2002 | Follingstad et al. |
| 6,497,578 | B1 | 12/2002 | Kwong et al. |
| 6,522,548 | B1 | 2/2003 | Duggan et al. |
| 6,537,106 | B1 * | 3/2003 | Follingstad ............. 439/534 |
| 6,565,260 | B2 | 5/2003 | Belaidi et al. |
| 6,600,106 | B2 | 7/2003 | Standish et al. |
| 6,614,978 | B1 | 9/2003 | Caveney |
| 6,692,284 | B1 | 2/2004 | Koh |
| 6,711,339 | B2 | 3/2004 | Puetz et al. |
| 6,866,541 | B2 | 3/2005 | Barker et al. |
| 6,902,429 | B1 | 6/2005 | Brooks |
| 6,916,199 | B2 | 7/2005 | Follingstad |
| 6,916,213 | B2 | 7/2005 | Nyblin et al. |
| 6,918,786 | B2 | 7/2005 | Barker et al. |
| 6,971,909 | B2 | 12/2005 | Levesque et al. |
| 6,981,893 | B2 * | 1/2006 | Barker et al. ............ 439/540.1 |
| 2003/0129871 | A1 | 7/2003 | Follingstad |
| 2004/0209515 | A1 | 10/2004 | Caveney et al. |
| 2005/0142910 | A1 | 6/2005 | Levesque et al. |
| 2005/0142932 | A1 | 6/2005 | Levesque et al. |
| 2005/0185912 | A1 | 8/2005 | Levesque et al. |
| 2005/0233635 | A1 | 10/2005 | Denovich et al. |
| 2005/0233647 | A1 | 10/2005 | Denovich et al. |

OTHER PUBLICATIONS

Panduit product literature, DP6 PLUS Component Test Data, 1 page.
Panduit product literature, DP6 PLUS Patch Panels, 1 page.
www.panduit.com/products, Panduit Product Information, Copyright 1995-2003, 2 pages.
Ortronics product literature, 1997-98 Full Line System Solutions Catalog, 2 pages.
Ortronics product literature, The Complete Guide to Structured Cabling Systems, 1999, 2 pages.
Articles from "BISCINEWS" re PerfectPatch™, vol. 17, No. 6, Jan. 1997; vol. 17, No. 7, Feb. 1997; and vol. 17, No. 8, Apr. 1997, 16 pages.
Hubbell catalog, front cover page, pp. 4, 31, 60, 61, and back cover page.
Leviton Telcom catalog, front cover page, pp. D2 through D5, and back cover page, dated 1995.
PerfectPatch™ brochure, 4 pages.
AT&T PATCHMAX™ instruction sheets, 6 pages, dated Jan. 1996.
NORDX/CDT brochure entitled "IBDN Enhanced Connectivity," 4 pages, dated 1997.
Panduit® catalog, front cover page, pp. 5, 7, 8, 19, 59 through 67, and back cover page, dated 1996.
1996 Anixter catalog, front cover, pp. 1-6, 1-7, 1-20 through 1-24, 1-47, 1-48a, 1-49, 1-51, I-80a, 1-129, 1-138, 1-161, 1-184, and back cover page, dated 1996.
The Siemon Company Catalog 1997, front cover page, pp. 2-1 through 2-9, 2-18, 2-19, 14-6, and back cover page, dated 1997.
1997 Nordx/CDT catalog entitled "IBDN Catalog and Reference Guide," front cover page, pp. 5-21 through 5-29, and back cover page, Oct. 1996.
Lucent Technologies catalog entitled "SYSTIMAX® Structured Connectivity Solutions," front cover page, pp. 3-25 through 3-36 dated Jan. 1998.

* cited by examiner

TELECOMMUNICATIONS PATCH

TECHNICAL FIELD

The present disclosure relates generally to devices for use in the telecommunications industry, and various methods associated with such devices. More particularly, this disclosure relates to a telecommunications connecting panel assembly having a frame and connector modules pivotally mounted to the frame, wherein the connector modules include jacks on one side and wire terminations on an opposite side.

BACKGROUND

Local area networks and telecommunications connections often use patch panels to enable cross-connection between telecommunications equipment. Patch panels typically include front and rear connection locations. The rear connections are typically a more permanent type of connection, such as insulation displacement connectors to connect to copper based, twisted pair telecommunications cable. The front connections of the patch panel can include any of a variety of jacks for receipt of a plug of a patch cord or other transmission cable. The jack and plug allows fairly rapid connection and disconnection between two jacks in the same patch panel, or between one jack in the patch panel and another jack in a nearby patch panel, with the patch cord. One type of jack and plug arrangement for a patch panel is an RJ45 type connector. U.S. Pat. No. 5,639,261 is an example of a cross-connect panel including rear insulation displacement connectors, and front connector jacks for receiving plugs of patch cords.

There is an increasing need for cable management in order to protect and organize the various cables. One area where damage and/or loss of performance can occur with copper based, twisted pair cables is when excessive bending of the cable occurs. Falling below minimum bend radii of the cables can adversely affect performance with the transmission of signals through the copper wire patch cords. Another area of concern relates to difficulties that arise when coupling a plurality of jacks to the panel and maintaining separation of the cables associated with the jacks. Therefore, there is a need for patch panels that address the cable management concerns noted above.

SUMMARY

One aspect of the present disclosure relates to a connecting panel assembly including pivot modules that are pivotally connected to a frame of the assembly. The pivot modules include a plurality of jack modules. The jack modules have a plug opening on one side and wire terminations on an opposite side. The pivot modules are pivotally coupled at opposite ends of the frame. The pivot modules can pivot from a closed position wherein the pivot modules are aligned parallel with the frame, and an open angled position wherein the pivot modules are positioned at an angled position relative to the frame. The assembly also includes a support member that supports the pivot modules in the angled position.

A variety of examples of desirable product features or methods are set forth in part in the description that follows, and in part will be apparent from the description, or can be learned by practicing various aspects of the disclosure. The aspects of the disclosure can relate to individual features as well as combinations of features. It is to be understood that both the foregoing general description and the following detailed description are explanatory only, and are not restrictive of the claimed invention.

DETAILED DESCRIPTION

Figure 1:
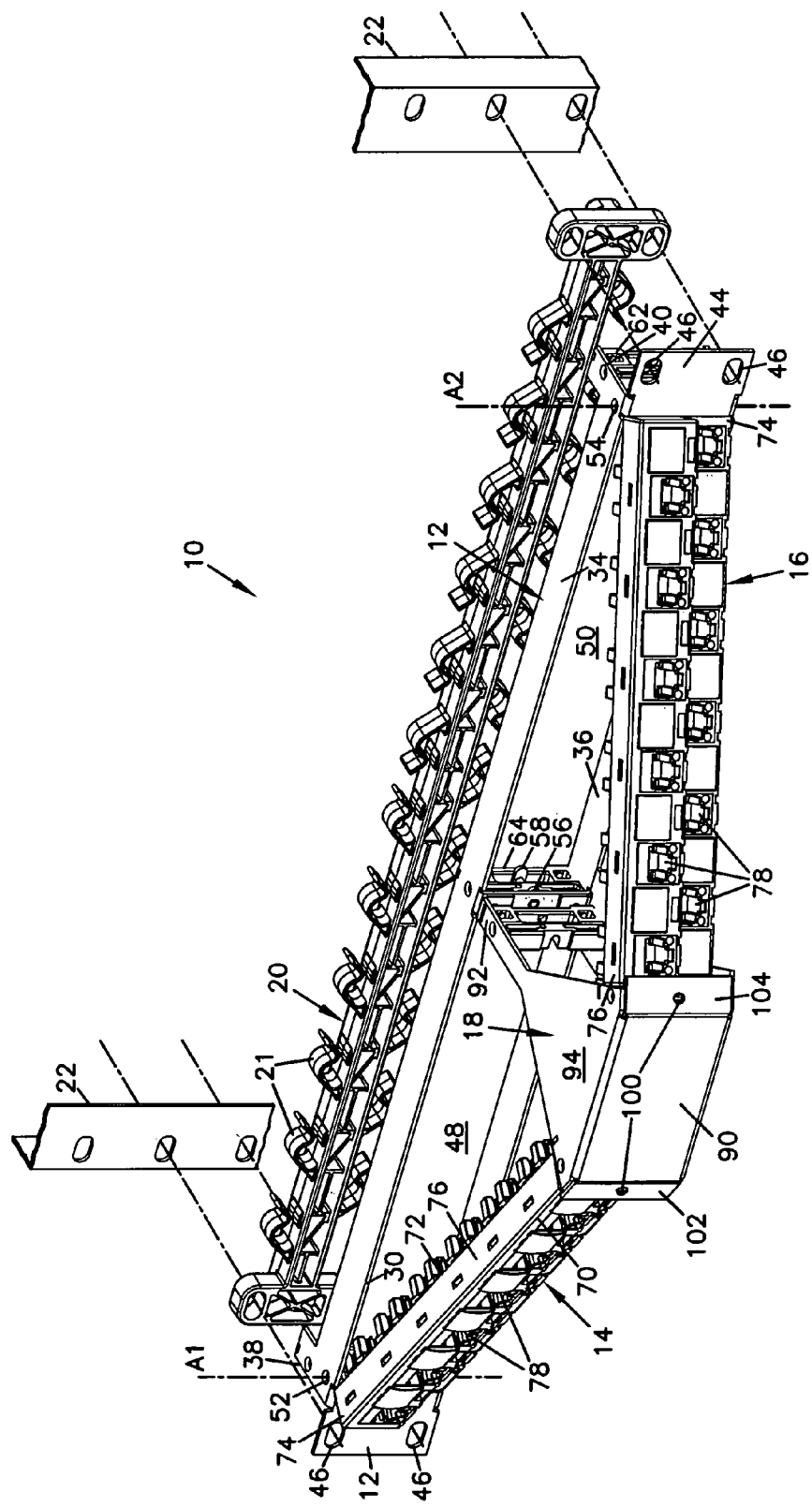
FIG. 1 is a front perspective view of an example patch panel assembly in accordance with the principles of the present disclosure, the assembly including a frame, a pair of pivot modules coupled to the frame in an open angled position, and a first example cable manager.

Reference will now be made in detail to various features of the present disclosure that are illustrated in the accompanying drawings. The present disclosure relates to telecommunications patch panels, and more particularly relates to patch panel assemblies that include connector modules that are pivotally connected to a frame of the assembly. The connector modules include jack ports on one side and wire termination locations on an opposite side. The connector modules are pivotally coupled at opposite ends of the frame. The connector modules can pivot from a closed position wherein the modules are aligned parallel with the frame, and an angled position wherein the modules are locked in an angled position non-parallel with the frame. In the angled position, the modules provide a shaped structure that facilitates access to the jacks and reduces bend angles for cables coupled to the jacks.

I. Panel Assembly of FIGS. 1-10

Referring now to FIGS. 1-5, an embodiment of a patch panel assembly 10 is shown for use in connecting telecommunications equipment. Patch panel assembly 10 is especially useful to cross-connect equipment through one or more patch panel assemblies 10 or other panels. Patch panel assembly 10 mounts to a rack (e.g., a portion of a rack 22 shown in FIG. 1) of conventional construction. The patch panel assembly 10 includes a frame 12, first and second pivot modules 14, 16 pivotally mounted to the frame 12, a central support 18, and a cable manager 20. The pivot modules 14, 16 are mounted to the frame 12 in such a way that they pivot between a closed position (see FIGS. 4 and 5) and an open or angled position (see FIGS. 1-3). The central support 18 supports the pivot modules 14, 16 in the closed and open positions.

The frame 12 includes front and rear planes or faces 30, 32, top and bottom sides 34, 36, and first and second ends 38, 40. A pair of brackets 42, 44 extend from first and second ends 38, 40. The brackets 42, 44 include through holes 46 for purposes of mounting the frame to a rack (e.g., partial rack 22 shown in FIG. 1). The frame 12 defines first and second openings 48, 50 on opposite sides of the support 18 sized to receive portions of the first and second pivot modules 14, 16. The frame 12 also includes apertures 52, 54 at opposite ends 38, 40 through which pivot fasteners (e.g., screws) extend for pivotally mounting the pivot modules 14, 16 to the frame 12. When the pivot modules 14, 16 are arranged in the closed position (see FIGS. 4 and 5) the pivot modules extend in a direction generally parallel with the front and rear faces 30, 32 and the brackets 42, 44. The pivot module 14 pivots about a pivot axis A1 (see FIGS. 1 and 3) that passes through aperture 52. The pivot module 16 pivots about a pivot axis A2 that passes through aperture 54.

A pair of stiffener supports 60, 62 are positioned at opposite ends 38, 40 of the frame 12 between the top and bottom sides 34, 36. A cam stiffener support 64 is positioned between the top and bottom sides 34, 36 at a central location between ends 38, 40. The support 64 includes locking cams 56a for securing the pivot modules 14, 16 in either the open or closed position.

Figure 8:
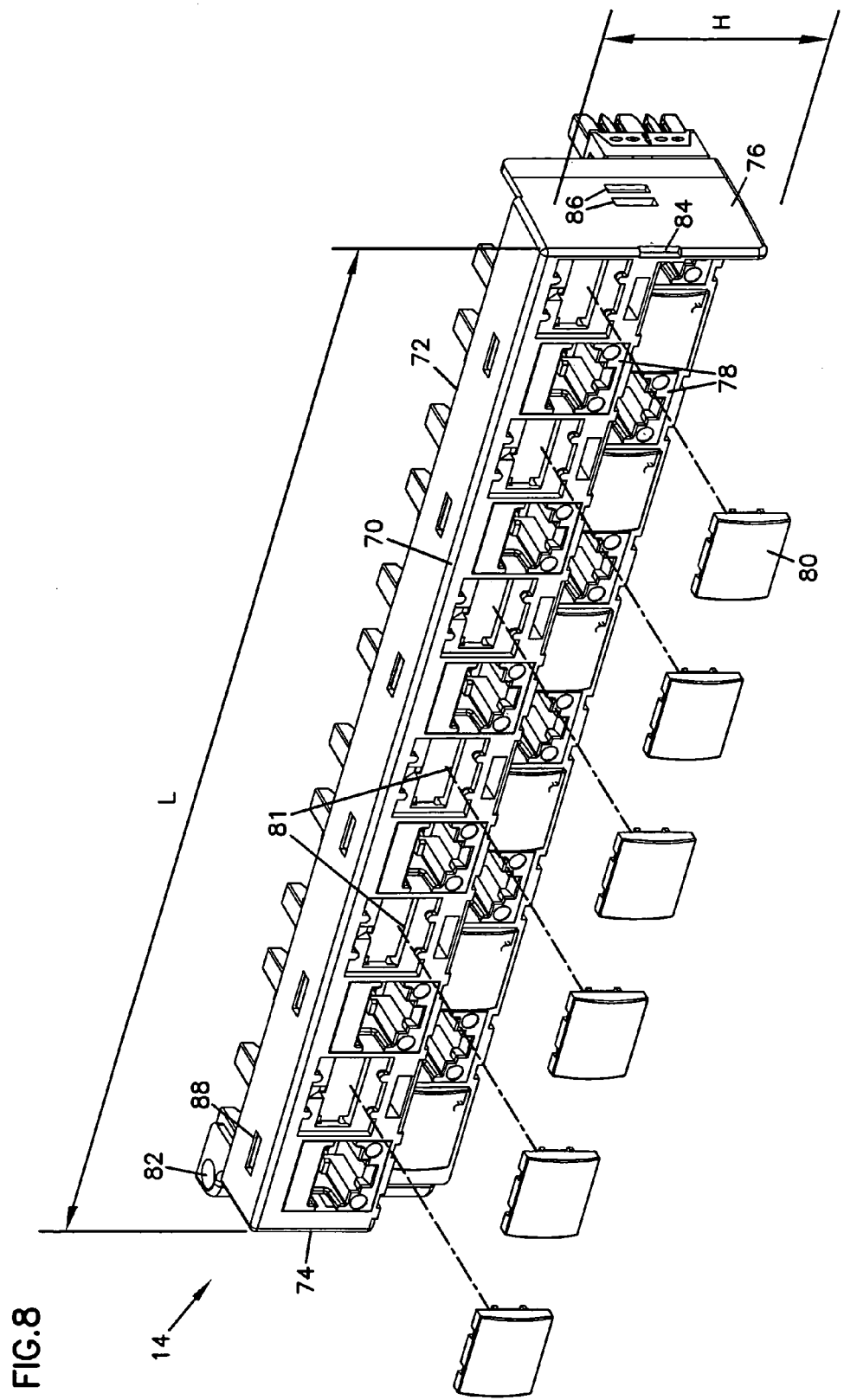
FIG. 8 if a front perspective view of the pivot module shown in FIG. 7 with some of the cover members removed.

The first and second pivot modules 14, 16 each include front and rear planes or faces 70, 72, first and second ends 74, 76, a plurality of connector jack modules 78 positioned within rows of module openings 77, and an aperture 82 through which a pivot fastener extends for mounting the modules 14, 16 at the first end 74. The pivot modules 14, 16 also include an aperture or indent 84 at a front edge at the second end 76, and an aperture or indent 86 positioned along an end surface at the second end 76. The apertures 84, 86 are used to lock the pivot modules in the open position. The pivot modules 14, 16 have a height H and a length L as shown in FIG. 8.

The connector jack modules 78 each include a front port for receiving a plug and a plurality of rear insulation displacement connectors as described in further detail below related to FIGS. 11-15. The connector jacks modules 78 are aligned in two rows (shown stacked above and below each other in the FIGS) with individual jack modules being spaced apart from each other. The connector jack modules 78 are secured in the module openings 77 with a snap fit connection.

Figure 7:
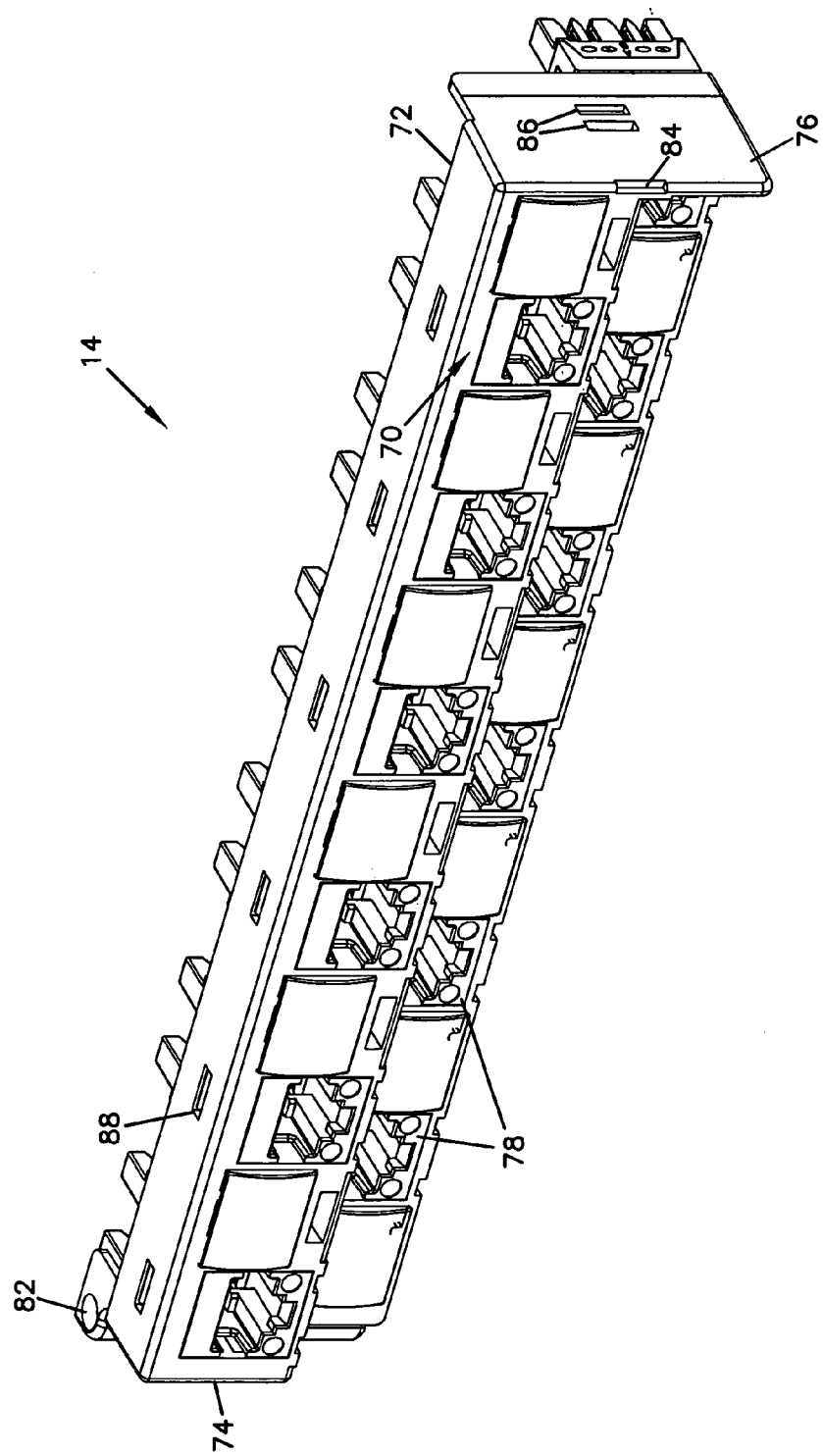
FIG. 7 is a front perspective view of the left side pivot module shown in FIG. 1.
Figure 9:
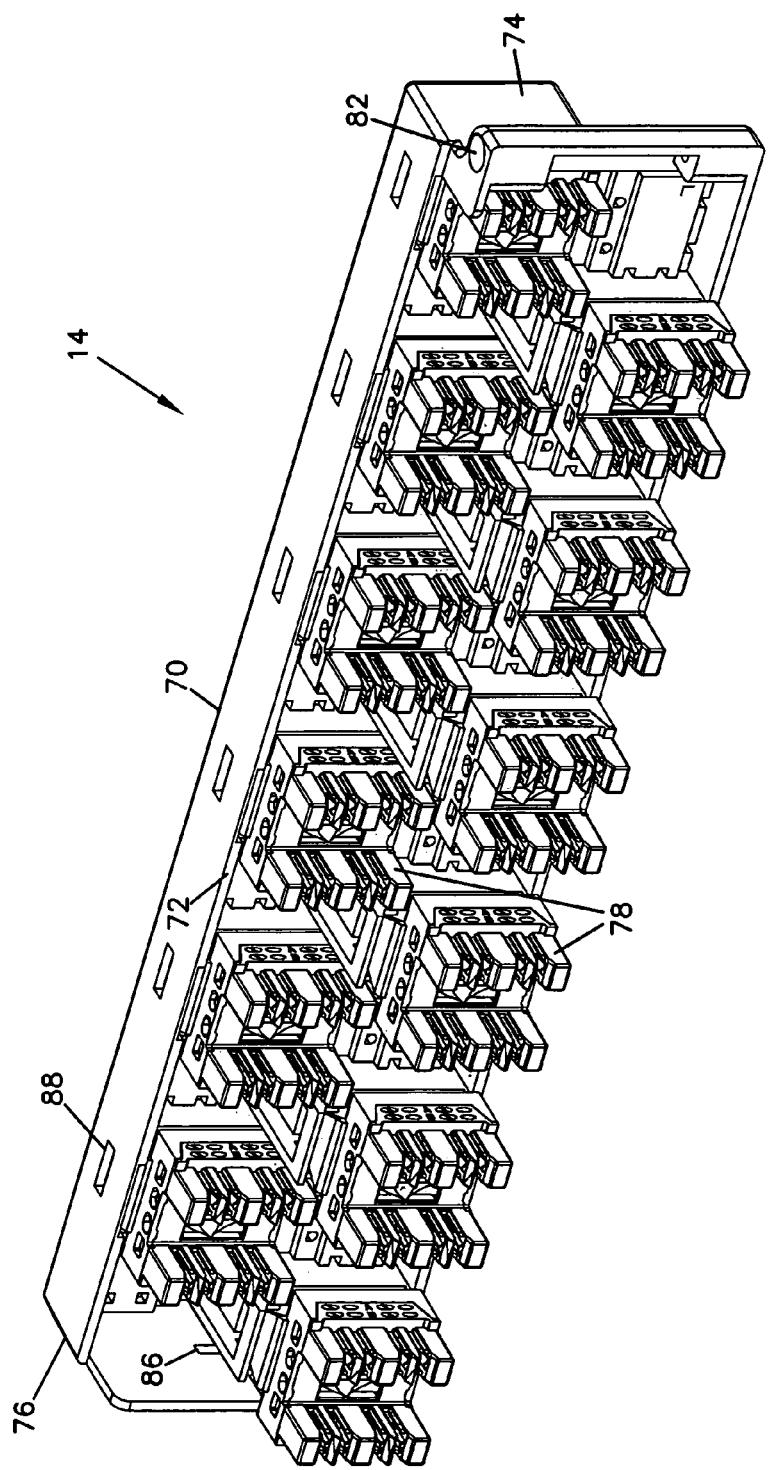
FIG. 9 is a rear perspective view of the pivot module shown in FIG. 7.

A plurality of removable covers 80 are interspaced between the connector jack modules 78. The covers 80 can include a clear material that provides viewing through the covers 80. Designation labeling can be mounted behind the covers 80. FIGS. 7-9 provide a close-up view of the pivot module 14. The upper row of connector jack modules 78 is offset in a forward direction from the lower row of connector jack modules 78. Further, connector jack modules on the upper row are offset laterally from the connector jack modules in the lower row (i.e., the jack modules in upper and lower rows are not aligned vertically) as shown in FIG. 1.

In alternative arrangements, the pivot modules have a different arrangement of connector jack modules. For example, the rows of connector jack modules and corresponding wire termination members can be arranged in a single vertical plane rather than the offset orientation shown in the figures. In another example, the connector jack modules are positioned directly adjacent to each other rather than being spaced apart.

Figure 5:
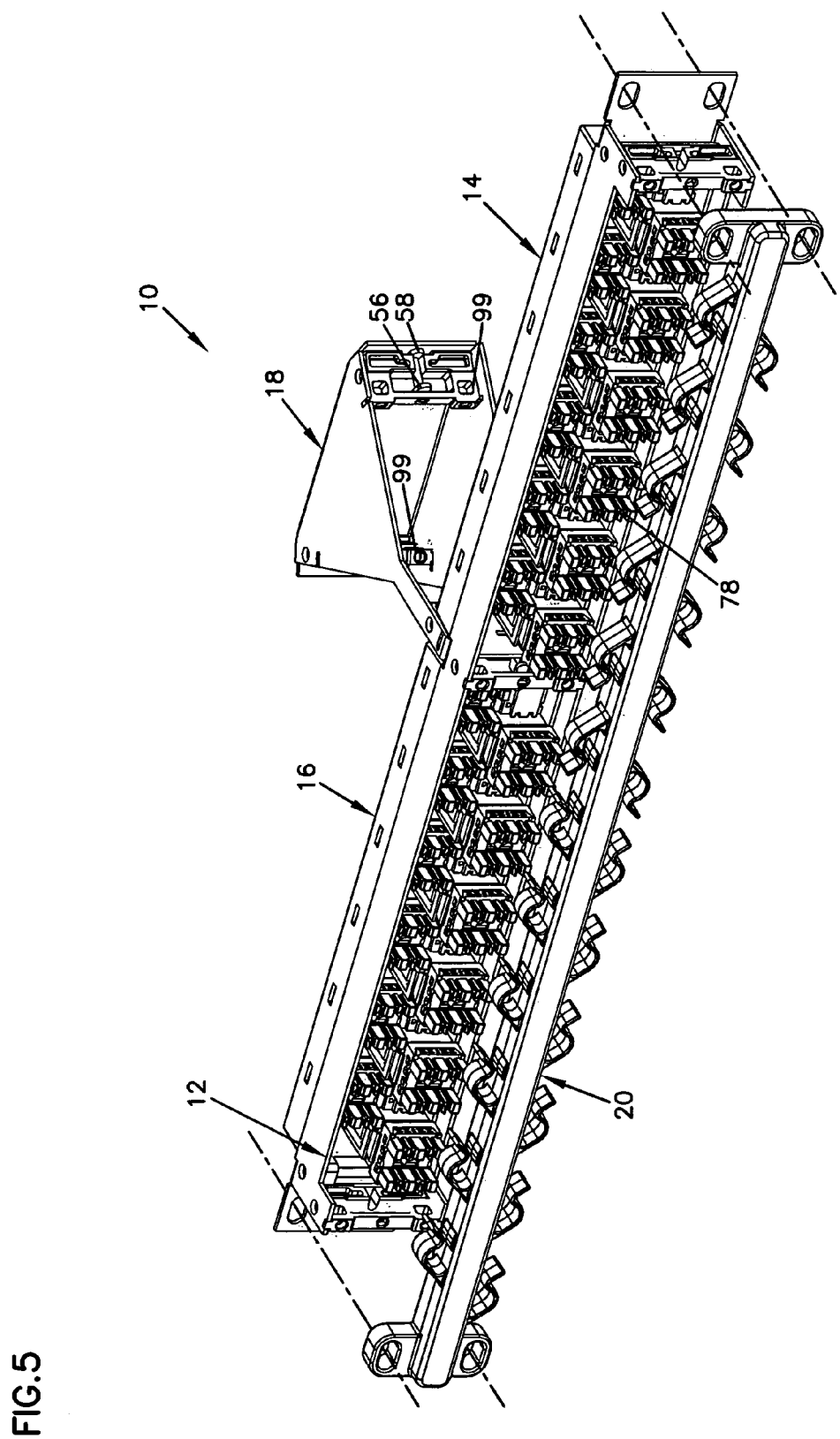
FIG. 5 is a rear perspective view of the patch panel assembly of FIG. 1 with the pivot modules arranged in the closed position.
Figure 6:
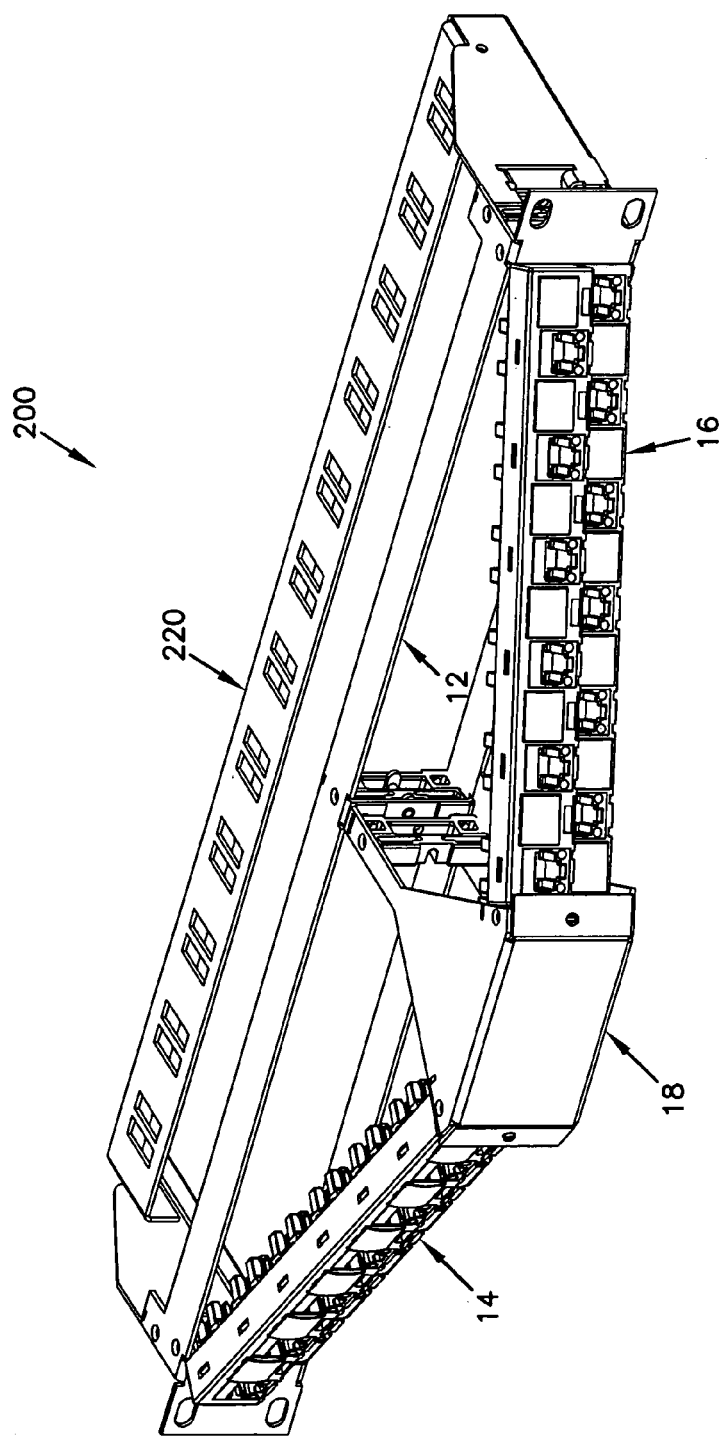
FIG. 6 is a front perspective view of the patch panel assembly of FIG. 1 with a second example cable manager.

The central support 18 includes front and rear ends 90, 92, top and bottom spaced apart walls 94, 96, a stiffener post 98 positioned at the rear end 92 between the walls 94, 96, and stiffener posts 99 at the front end 90 between walls 94, 96 (see FIG. 5). The stiffener posts 98, 99 provide structure that spaces apart the walls 94, 96 and secures the walls 94, 96 together. The support 18 further includes cams 56b used to secure the pivot modules in the open or angled position, and side bevels 102, 104 that act as stops for limiting the forward pivotal movement of the pivot modules 14, 16.

The central support 18 acts as a guide track for movement of the otherwise unsupported second ends 76 of the pivot modules 14, 16 between the closed and open positions. The top and bottom sides 94, 96 provide a track structure wherein the second ends 76 of the pivot modules 14, 16 move through a rotation path between the closed position (see FIG. 4) and open position (see FIG. 1). The side bevels 102, 104 and cams 56b are used to secure the pivot modules 14, 16 in the open position. The locking cams 56a, 56b can be mounted to the stiffener posts 64, 99. Screw heads allow the cams 56a, 56b to be turned from the front of the panel assembly 10. Cams 56a, 56b fit within the indents 84, 86 to secure the pivot modules in the open or closed positions. Another example latching system configured to releaseably retain a pivoting telecommunications module in place is disclosed in U.S. Published Patent Application No. 2005/0191901, which application is incorporated herein by reference. It will be appreciated that any other type of latching arrangement could also be used.

The stiffener posts 60, 62, 64, 98, 99 can be separate pieces that are connected to the frame 12 and support 18, or can be integrally formed as part of the frame 12 and support 18. Further, the locking cams 56a, 56b can be integrally formed with the frame 12 and support 18 as separate pieces from the stiffener posts 60, 62, 64, 98, 99.

Figure 2:
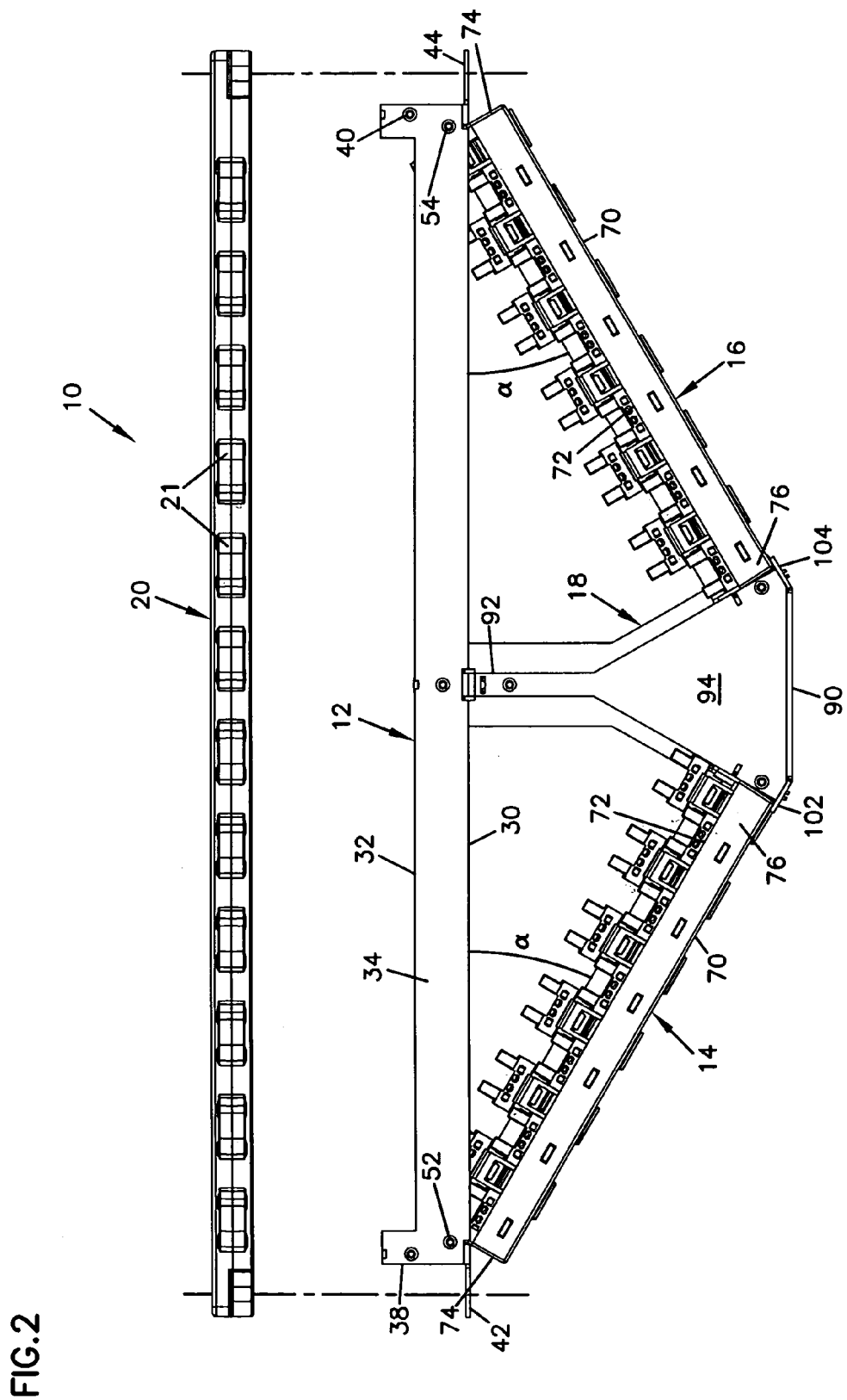
FIG. 2 is a top view the patch panel assembly of FIG. 1 with the pivot modules arranged in the angled position.

The open position is attained by rotating the pivot module 14 from the closed position (shown in FIGS. 4 and 5) in a clockwise direction and rotating the pivot module 16 in a counterclockwise direction (as seen from the top view of FIG. 2). When the pivot modules are rotated from the open position back into the closed position, the pivot modules 14, 16 rotate in the counterclockwise and clockwise directions, respectively.

An angle of rotation a (see FIG. 2) of the pivot modules 14, 16 is measured from the front face 30 of the frame 12 and the front face 70 of the pivot modules. The rotation angle α between the close position of FIG. 4 and the open position of FIG. 1 is about 10° to about 60°, and more preferably about 30° to about 35°. In the closed position, the back side of the pivot modules 14, 16 abuts against the front face of the frame 12, which orients the pivot modules 14, 16 parallel with the longitudinal dimension of the frame 12. In the open position shown in FIG. 1, front side of the pivot modules 14, 15 abut against the bevels 102, 104. The cams 56b on the stiffeners 99 are used to lock the pivot modules 14, 16 in the open position and the cams 56a on the stiffener 64 are used to lock the pivot modules 14, 16 in the closed position. In alternative arrangements, the panel assembly 10 can include additional locking cams 56a, 56b positioned along the module support 18 to hold the pivot modules at different angled positions.

Figure 18:
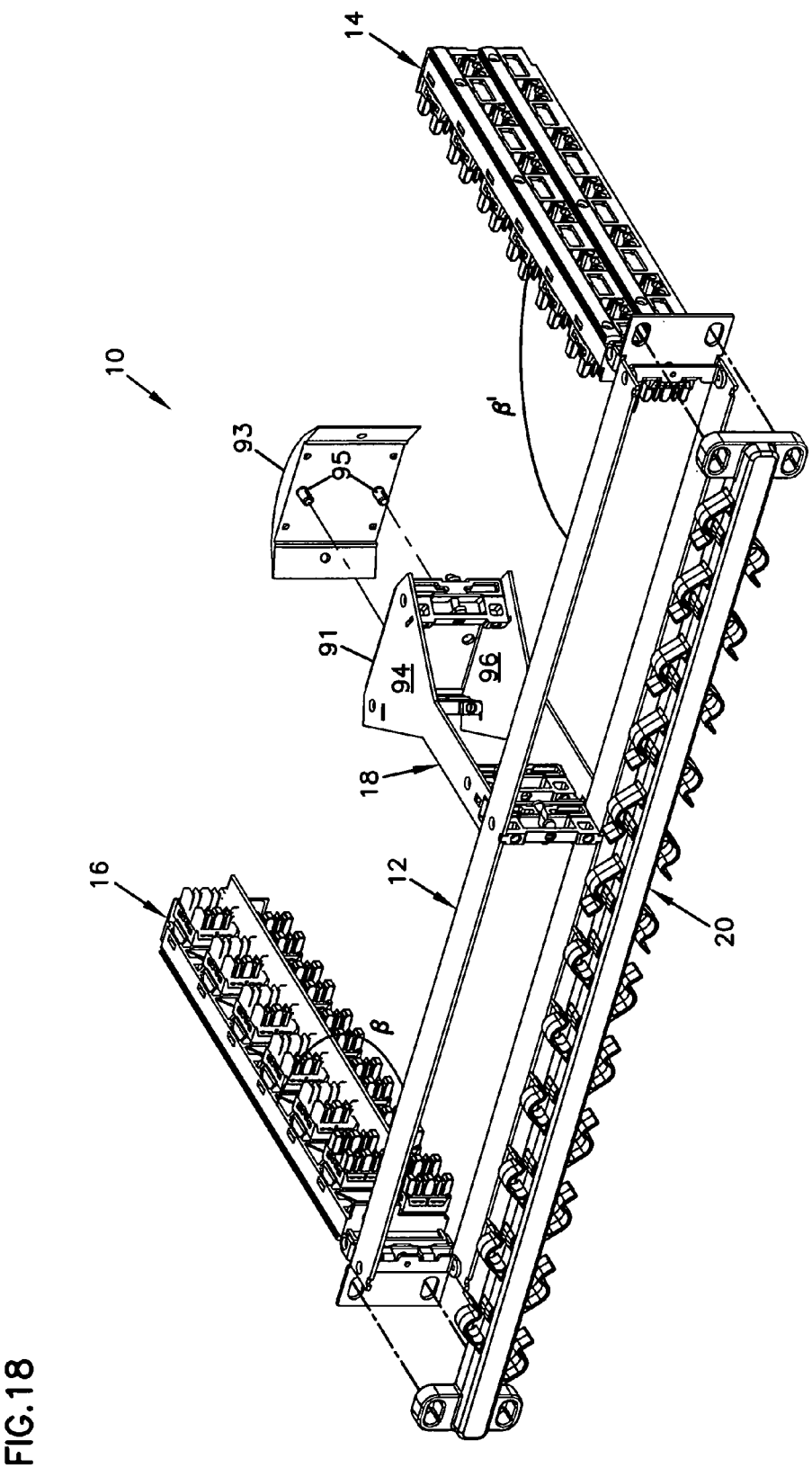
FIG. 18 is a rear perspective view of the patch panel assembly of FIG. 1 with the pivot modules arranged in a second open angled position and the nose piece removed.
Figure 19:
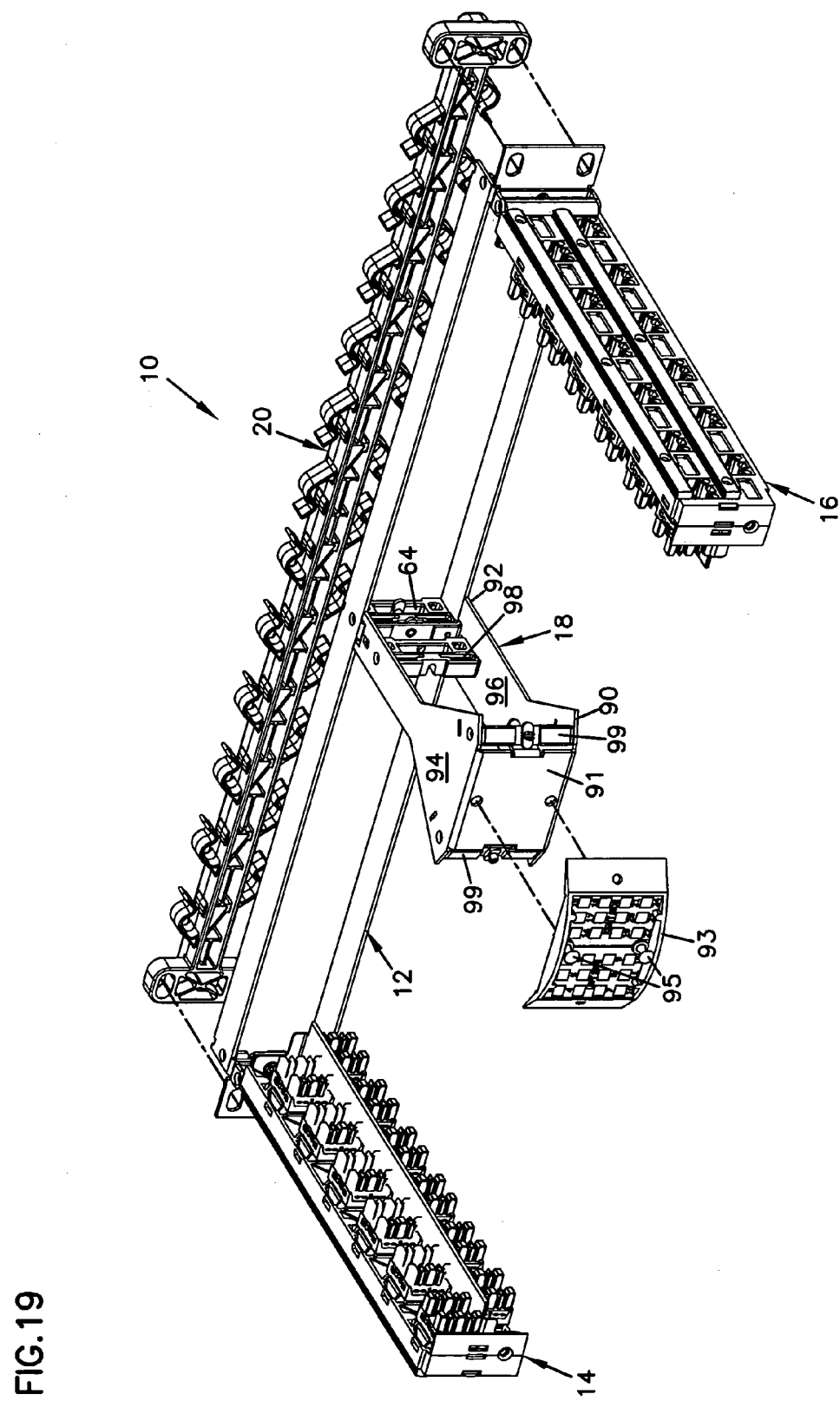
FIG. 19 is a front perspective view of the patch panel assembly shown in FIG. 18.
Figure 20:
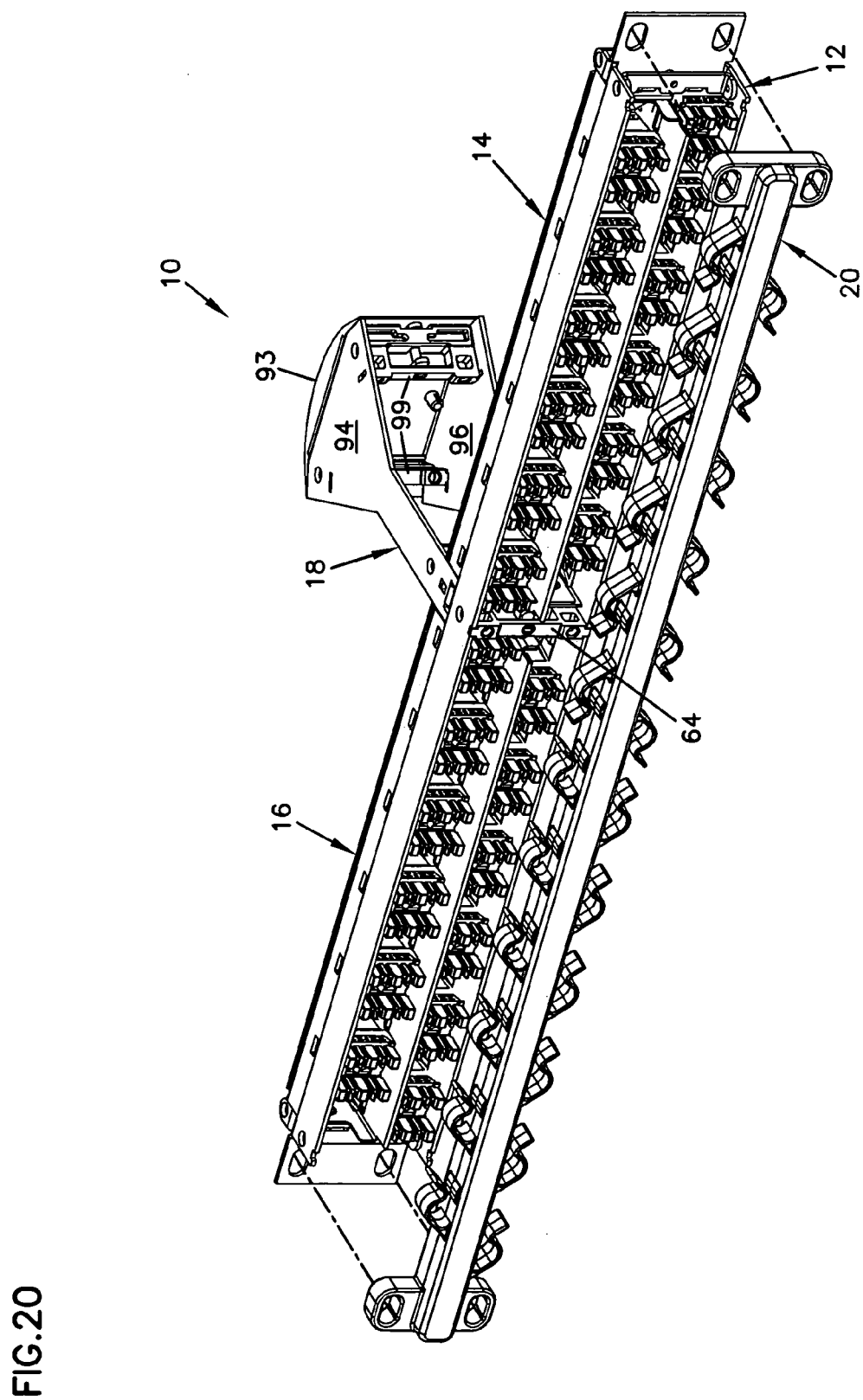
FIG. 20 is a rear perspective view of the patch panel assembly of FIG. 16 with the pivot modules arranged in a closed position.

Furthermore, the panel assembly 10 can be configured to permit the pivot modules 14, 16 to rotate beyond the open angled position shown in FIG. 1. In one arrangement, the module support 18 can have a greater length (measured from the front end 90 to the rear end 92 at the frame 12) and width (measured between outer edges of side bevels 102, 104) that could support the pivot modules in rotated positions with an angle α greater than shown in FIG. 1. In other arrangements, the panel assembly is configured to permit the pivot modules 14, 16 to pivot away from the module support as shown in FIGS. 18 and 19 to an angle α of, for example, greater than 60°, and preferably about 80° to about 100°. The side bevels 102, 104 may need to be removed or modified in order to permit such rotation. The capability to rotate the pivot modules 14, 16 into a range of different angled positions can provide improved operability for a user connecting plugs, connectors, wires, etc. to the pivot modules 14, 16.

When coupling patch cords (not shown) to the connector jack modules 78, orienting the pivot modules at an angle within these preferred ranges of angles provides strain relief in the cables that helps prevent cable damage and/or loss of cable performance. The cable positioning provided by the angled pivot modules 14, 16 in the angled position helps reduce the likelihood of falling below the minimum bend radius of the cable as each cable travels to other connector jack modules or other equipment. Such strain relief is advantageous over a perpendicular mounting of the connector plug relative to the cable pathway.

Figure 3:
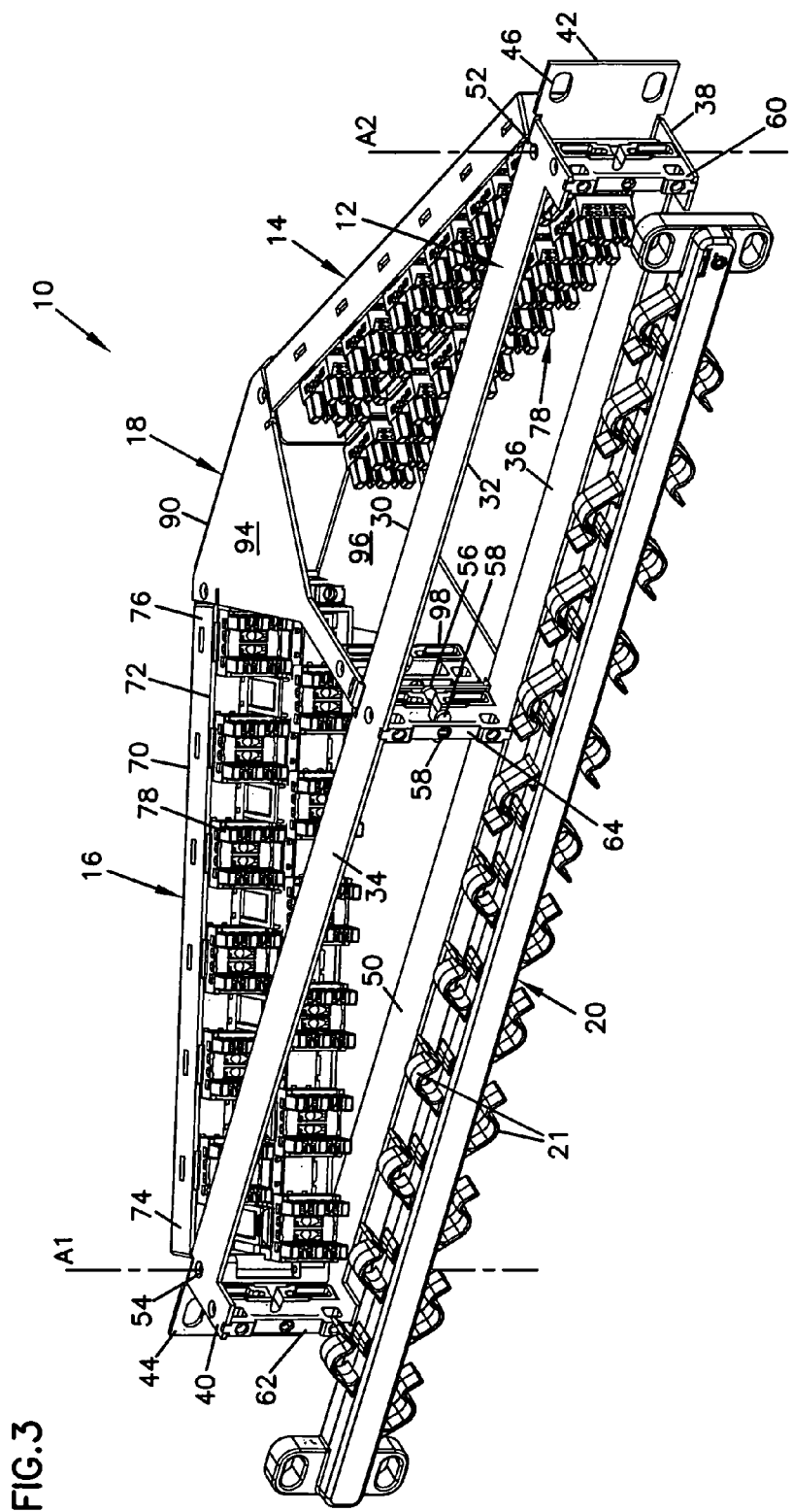
FIG. 3 is a rear perspective view of the patch panel assembly of FIG. 1 with the pivot modules arranged in the angled position.
Figure 4:
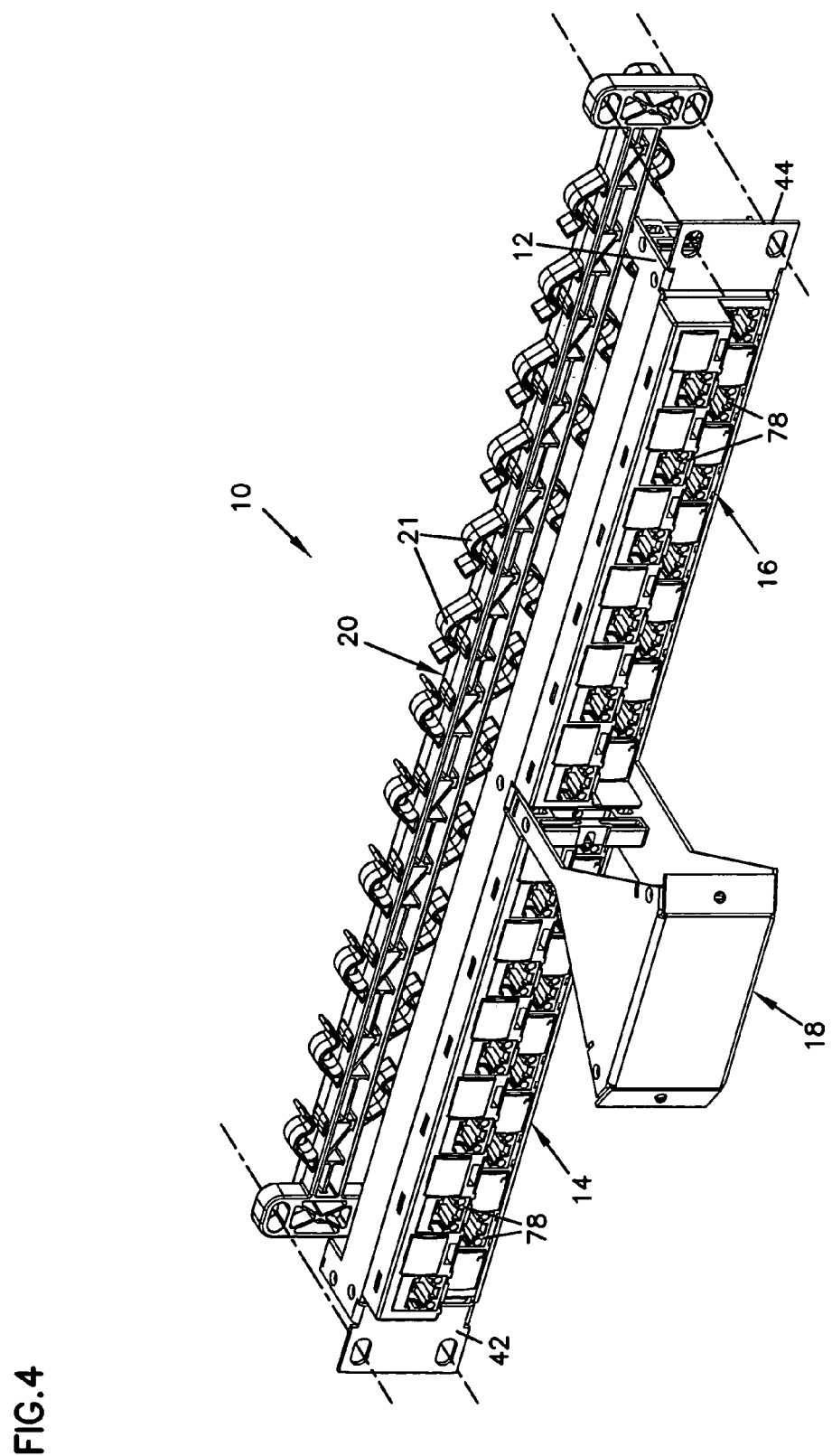
FIG. 4 is a front perspective view of the patch panel assembly of FIG. 1 with the pivot modules arranged in a closed position.

When operating the patch panel assembly 10 during coupling of wires and cables to the pivot modules 14, 16, each pivot module 14, 16 is first positioned in the closed orientation (shown in FIGS. 4 and 5) wherein a front face of the pivot module is aligned generally parallel with a front face or surface 32 of the frame 12. Because the frame 12 is configured as a linear member between opposite ends 38, 40 that is aligned generally parallel with the brackets 42, 44, the pivot modules 14, 16 are also aligned generally parallel with each other when they are each in the closed position. In the closed position, it can be easier to use a termination tool (not shown) to mount wires (not shown) to each of the jack modules 78. When the wires have been mounted to the wire jack modules 78, the locking cams 56a, 56b are released to allow rotation of the pivot modules 14, 16 into an angled position relative to the frame 12. The pivot modules 14, 16 rotate until the second ends 76 engage the locking cams 56a, 56b of the stiffener 99 at the front end 90 of the central support 18. Fasteners 100 can be used to secure the pivot modules 14, 16 in the angled position as shown in FIGS. 1-3.

The pivot modules 14, 16 rotate about a pivot fastener inserted into aperture 82, which are aligned parallel with apertures 52, 54 and stiffeners 60, 62 of the frame 12. Similar fasteners are also preferably provided at the bottom of the frame 12. The axis of rotation of the pivot modules 14, 16 via the pivot fastener extending through the aperture 82 is aligned generally parallel with the front face 30 of the frame and face 70 of the pivot modules. The fastener extending through apertures 52, 54, 82 can be, for example, a screw that is inserted through the opening 82 into the openings 52, 54 defined in the plastic body of stiffeners 60, 62. The screw can provide both fastening function to secure the pivot modules 14, 16 to the frame 12 while permitting the pivot modules 14, 16 to pivot relative to the frame 12.

II. Jack Module of FIGS. 11-15

Figure 10:
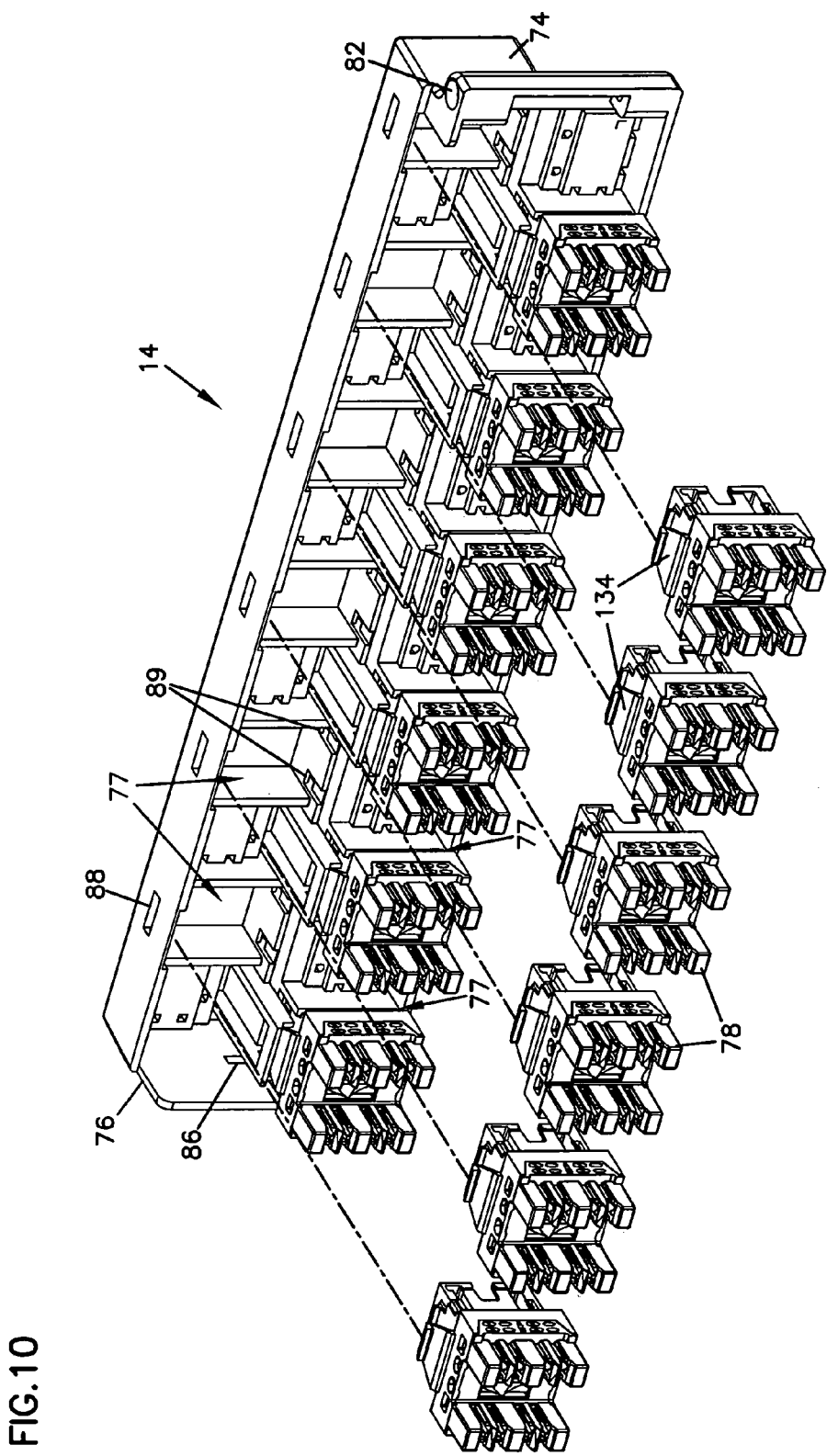
FIG. 10 is a rear perspective view of the pivot module shown in FIG. 7 with some of the jack modules removed.
Figure 11:
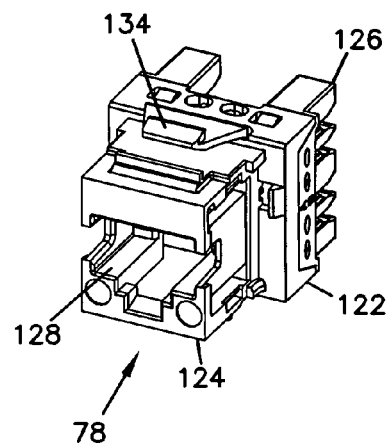
FIG. 11 is a front perspective view of one of the jack modules shown in FIG. 1.
Figure 12:
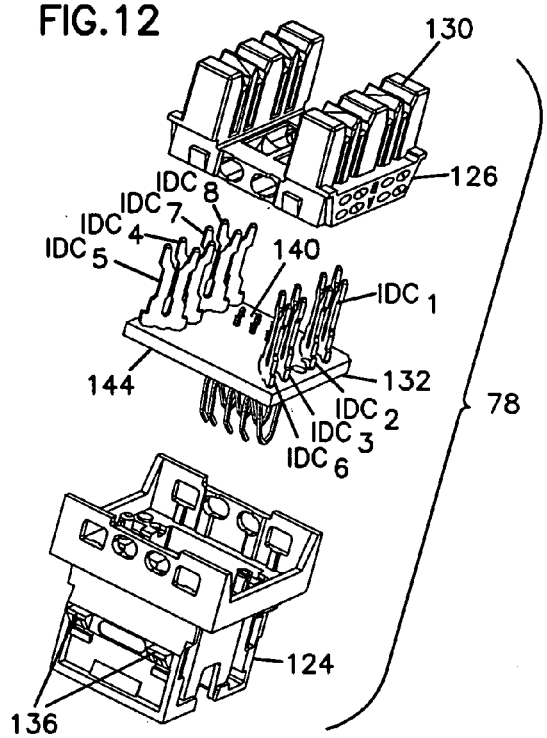
FIG. 12 is an exploded perspective view of the jack module shown in FIG. 11.

Referring now to FIGS. 11-12, one of the jack modules 78 shown in FIG. 10 is described in further detail. The jack modules 78 include a dielectric housing 122 having a front piece 124 and a rear piece 126. The front and rear pieces 124, 126 can be interconnected by a snap fit connection. The front piece 124 defines a front port 128 sized and shaped to receive a conventional telecommunications plug (e.g., an RJ style plug such as an RJ 45 plug). The rear piece 126 defines an insulation displacement connector interface and includes a plurality of towers 130 adapted to house insulation displacement connector blades/contacts.

The jack modules 78 further include a circuit board 132 that mounts between the front and rear pieces 124, 126 of the housing 122. A plurality of contact springs $CS_1$-$CS_8$ are terminated to a front side of the circuit board 132. A plurality of insulation displacement connector blades $IDC_1$-$IDC_8$ are terminated to a back side of the circuit board 132. The contact springs $CS_1$-$CS_8$ extend into the front port 128 and are adapted to be electrically connected to corresponding contacts provided on a plug when the plug is inserted into the front port 128. The insulation displacement connector blades $IDC_1$-$IDC_8$ fit within the towers 130 of the rear piece 126 of the housing 122. The circuit board 132 has tracks $T_1$-$T_8$ (e.g., tracings, see FIGS. 14-17) that respectively electrically connect the contact springs $CS_1$-$CS_8$ to the insulation displacement connector blades $IDC_1$-$IDC_8$.

In use, wires are electrically connected to the contact springs $CS_1$-$CS_8$ by inserting the wires between pairs of the insulation displacement connector blades $IDC_1$-$IDC_8$. When the wires are inserted between pairs of the insulation displacement connector blades $IDC_1$-$IDC_8$, the blades cut through the insulation of the wires and make electrical contact with the center conductors of the wires. In this way, the insulation displacement connector blades $IDC_1$-$IDC_8$, which are electrically connected to the contact springs $CS_1$-$CS_8$ by the tracks on the circuit board, provide an efficient means for electrically connecting a twisted pair of wires to the contact springs $CS_1$-$CS_8$ of the jack modules 78.

Figure 13:
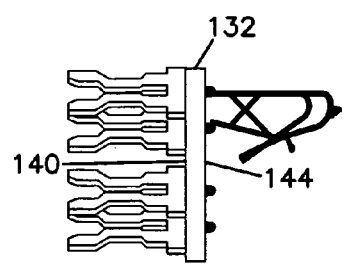
FIG. 13 is a side view illustrating the substrate and electrical contacts of the jack module shown in FIG. 11.
Figure 14:
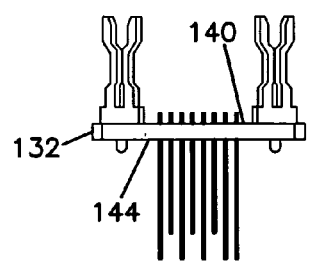
FIG. 14 is another side view of the substrate and electrical contacts shown in FIG. 13.
Figure 15:
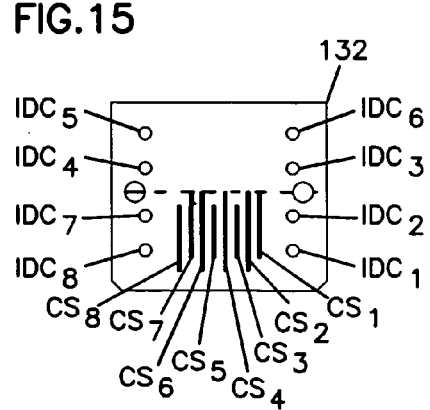
FIG. 15 is a front view of the substrate and electrical contacts shown in FIG. 13.
Figure 16:
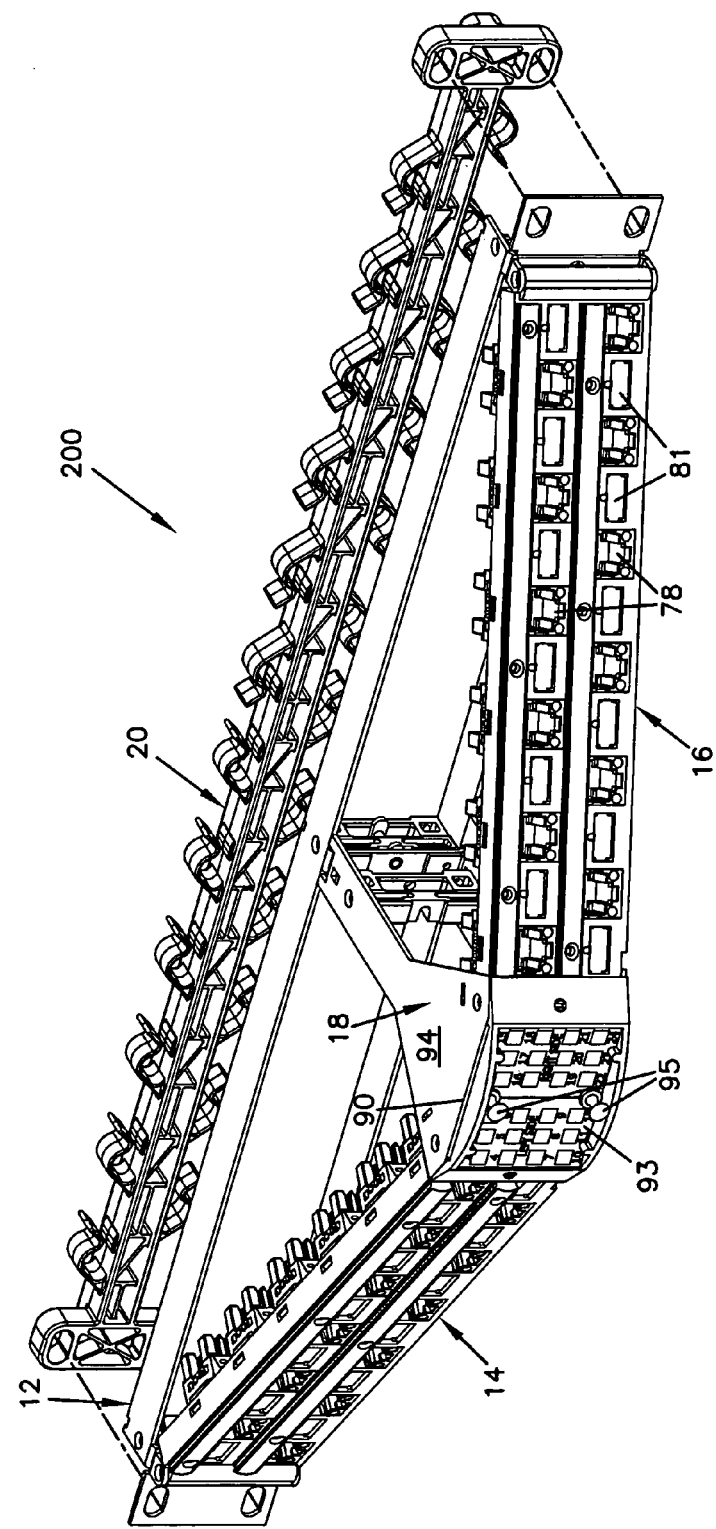
FIG. 16 is a front perspective view of another example patch panel assembly in accordance with the principles of the present disclosure, the assembly including a frame, a pair of pivot modules coupled to the frame in a first open angled position, a first example cable manager, and a nose piece.
Figure 17:
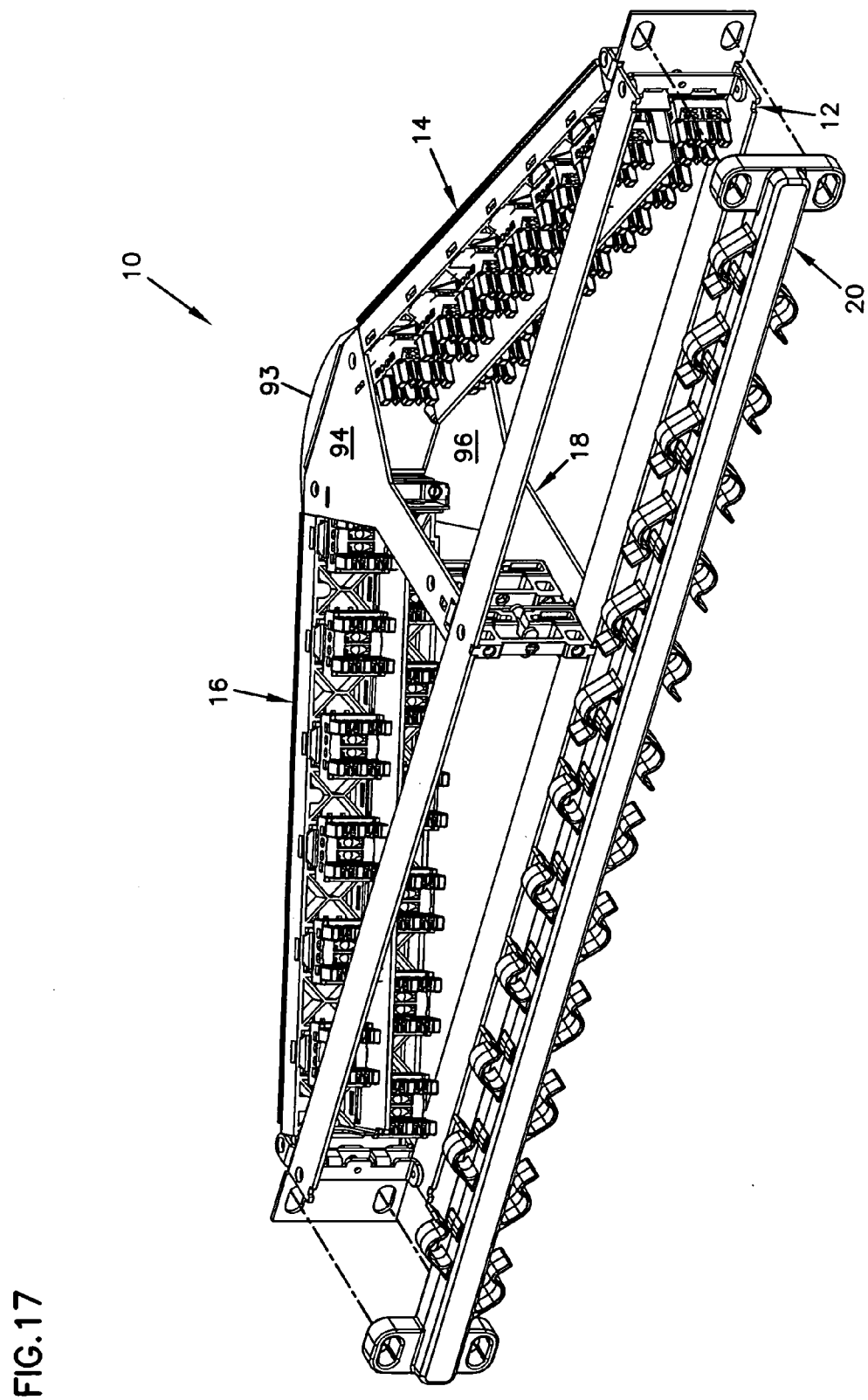
FIG. 17 is a rear perspective view of the patch panel assembly of FIG. 16 with the pivot modules arranged in the angled position.

The contact springs $CS_1$-$CS_8$ are shown more clearly in FIGS. 13-15. The relative positioning, shape and curvature of the contact springs $CS_1$-$CS_8$ is preferably adapted to provide some initial crosstalk compensation at the jack module 78.

Each jack modules 78 includes a resilient latch tab 134 (see FIG. 11) on a top side and a pair of latch posts 136 (see FIG. 12) on a bottom side. The latch tab 134 is received into a latch tab opening 88 (see FIG. 10) at a top side of the module openings 77 in the pivot modules 14, 16, and the latch posts 136 are received into latch post openings 89 (see FIG. 10) at a bottom side of each of the module openings 77 of the pivot modules 14, 16. The jack modules 78 is snap fit into the module opening 77 by first inserting the latch posts 136 into the openings 89 from the back side of the pivot module 14, 16, and then rotating the jack module until the latch tab 134 locks within the opening 88. In alternative arrangements, the jack modules can be secured to the pivot modules 14, 16 with other connection means such as fasteners and adhesives. Preferably, the jack modules 78 are connected to the pivot modules 14, 16 with a releasable connection.

III. Panel Assembly of FIGS. 16-24

Referring now to FIGS. 16-24, another example panel assembly 200 is shown and described. The panel assembly 200 includes many of the same or similar features as shown with reference to panel assembly 10 described above with reference to FIGS. 1-15. The panel assembly additionally includes a removable nose piece 93 secured to a front surface 91 of the module support 18. The nose piece 93 is secured to the module support 18 by fasteners such as, for example, manual pop rivets 95 that extend through the nose piece 93 into the front surface 91. The nose piece 93 has features that replace the function of side bevels 102, 104 shown in FIG. 1. By pulling out the pop rivets 95, the nose piece 93 can be removed from the module support 18. Once the nose piece 93 is removed, the pivot modules 14, 16 can be pivoted past the nose piece 93 and module support 19 to an open position as shown in FIGS. 18 and 19.

Figure 21:
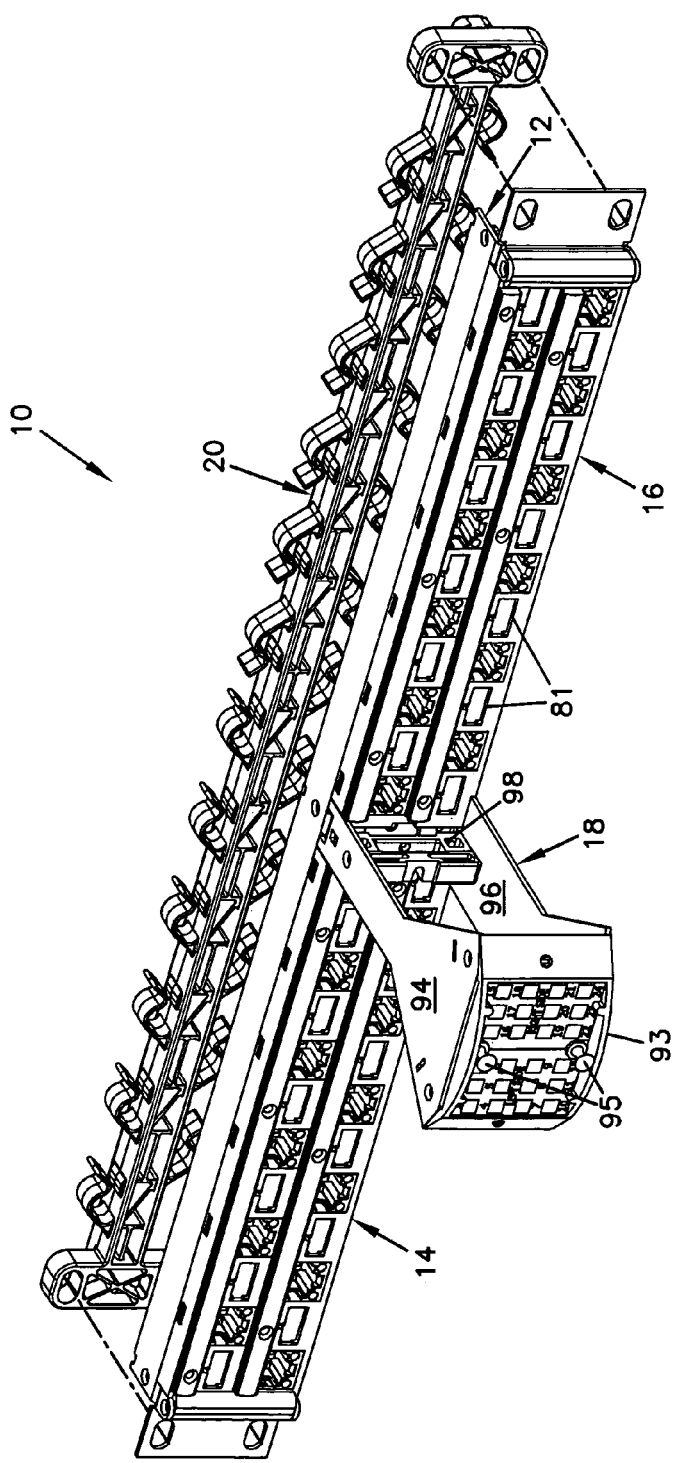
FIG. 21 is a front perspective view of the patch panel assembly of FIG. 1 with the pivot modules arranged in the closed position.
Figure 22:
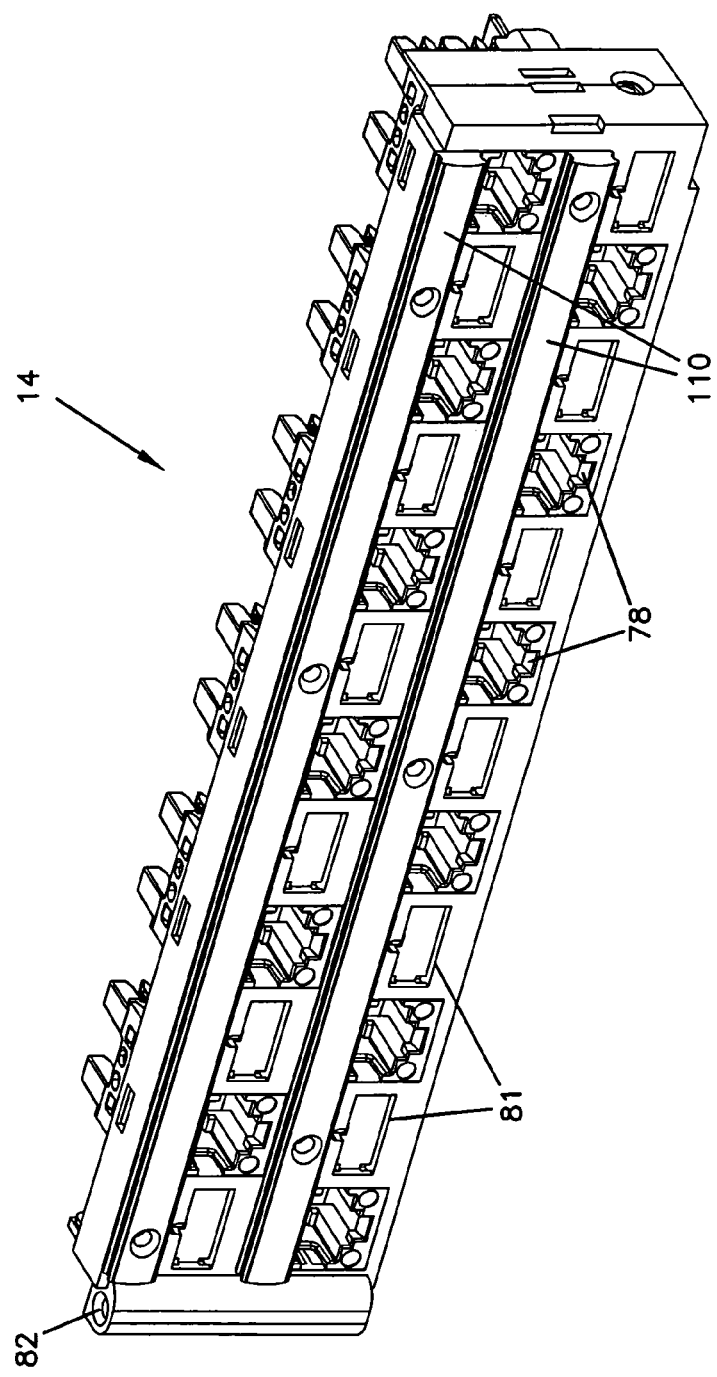
FIG. 22 is a front perspective view of the left side pivot module shown in FIG. 16.
Figure 23:
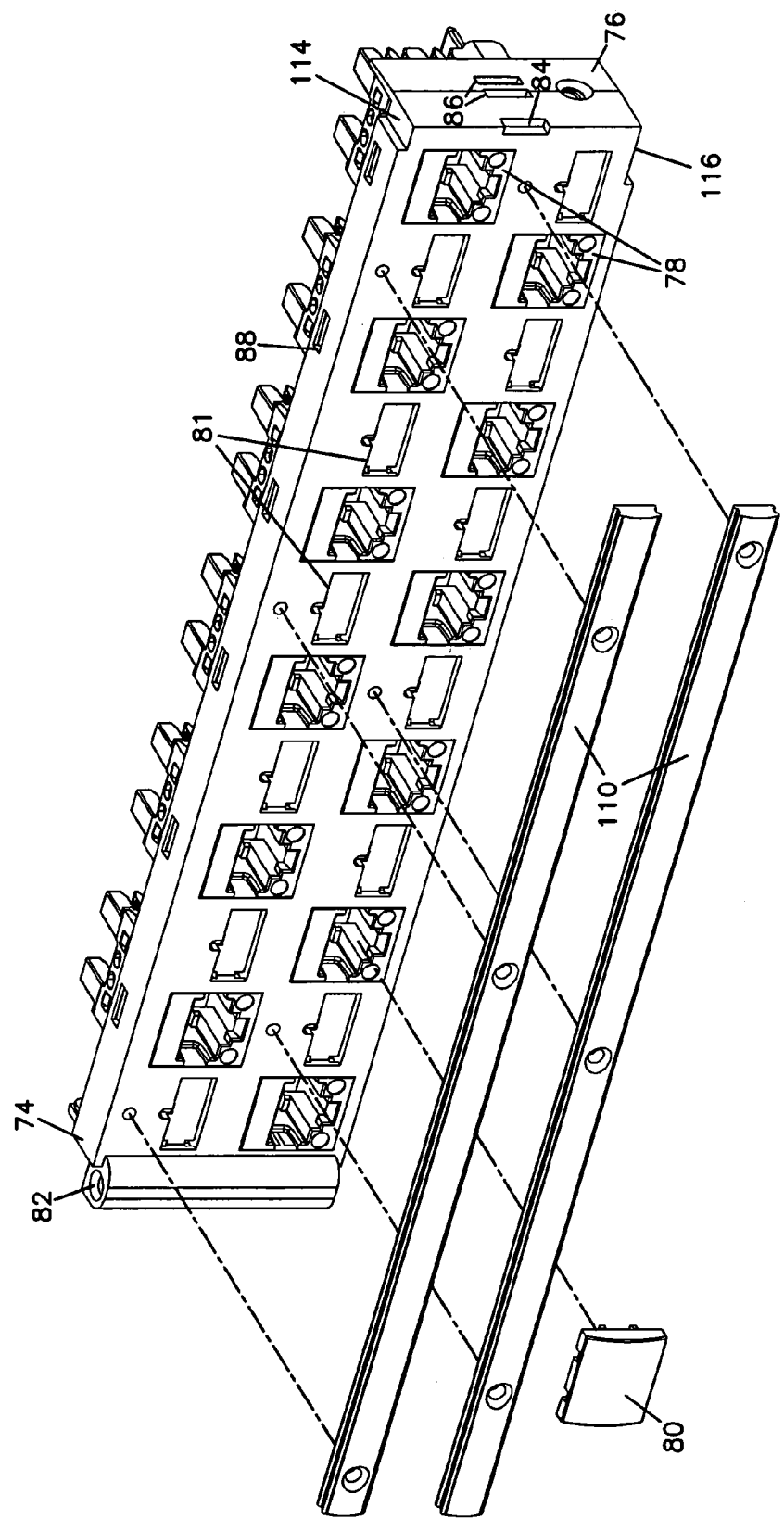
FIG. 23 is a front perspective view of the left side pivot module shown in FIG. 22 with a pair of designator strips and a cover member removed.

The pivot modules 14, 16 of panel assembly 200 include jack modules 78 that are staggered from left to right relative to one another as in panel assembly 10. However, the upper and lower rows of jack modules 78 on each pivot module 14, 16 are not staggered from front to back (see FIG. 21) as are the rows of jack modules 78 in panel assembly 10. Additionally, as also shown in FIGS. 21-23, each of the pivot modules 14, 16 has clear windows 81 for holding icons such as data/voice icons (not shown) or other identification material. The windows 81 can be covered with a cover member 80 (see FIG. 23) or other structure that prohibits viewing the windows 81. The pivot modules 14, 16 also include designation strips 110 over which clear slide windows can be mounted. The designation strips 110 allow designation information to be provided adjacent the ports.

Figure 24:
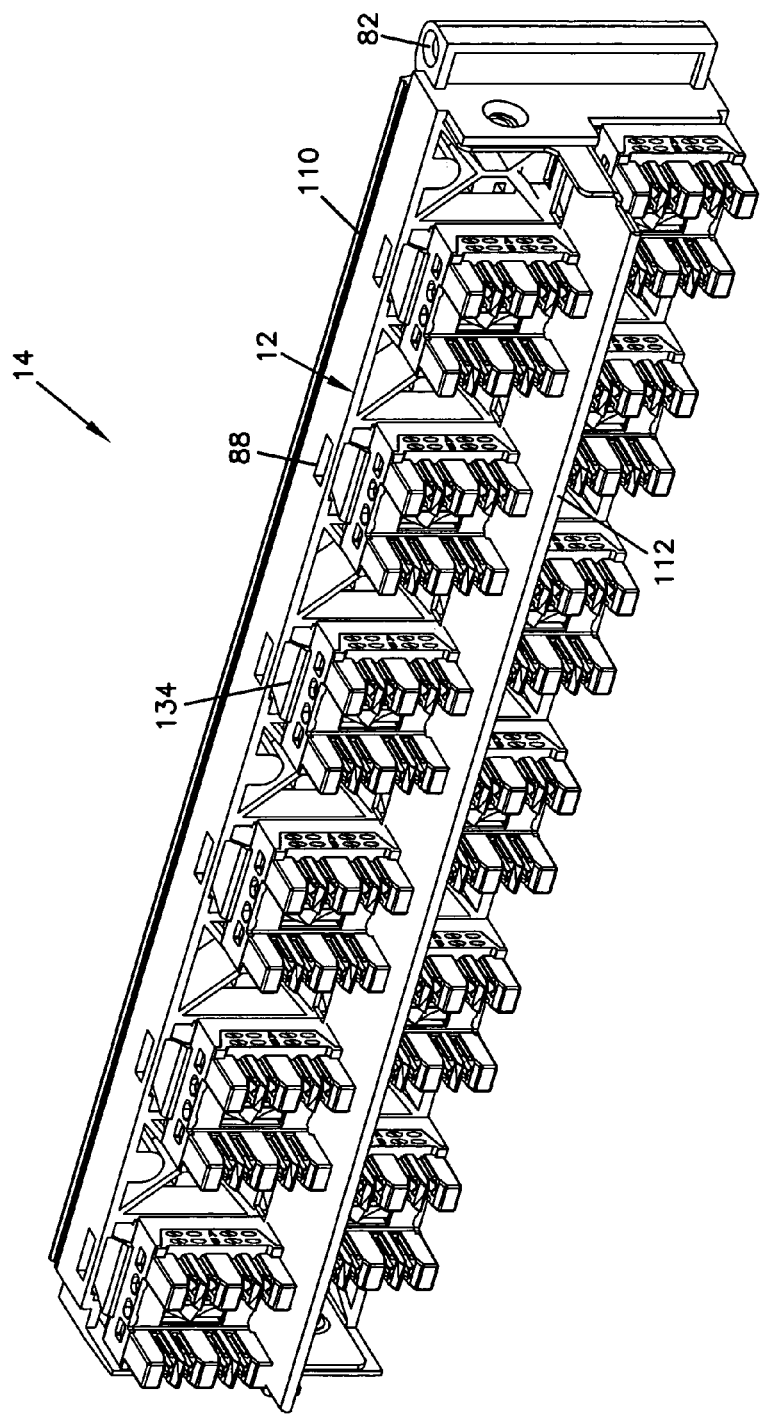
FIG. 24 is a rear perspective view of the left side pivot module shown in FIG. 16.

The pivot modules 14, 16 of panel assembly 200 include a shield member 112 between the upper and lower rows of jack modules (see FIG. 24). It will be appreciated that the shield member 112 can define the openings 89 for receiving the posts/pegs provided at the underside of the jack modules. The shield can comprise materials adapted for blocking transmissions that may cause cross-talk between the jack modules. Some example materials include metallic or carbon filled materials.

The latching arrangement for securing the pivot modules 14, 16 in place in panel assembly 200 works in a similar manner as described above with reference to panel assembly 10. For example, the pivot modules 14, 16 include recesses 84, 86 on the end of the pivot modules 14, 16 for receiving the locking cams 56a, 56b of the stiffening members 64, 99 to hold the pivot module in either the closed position (see FIG. 21) or the open angled position (see FIG. 19).

The pivot modules 14, 16 further include, with reference to FIG. 23, recesses 114, 116 at top and bottom sides at the end of the pivot modules 14, 16. The recesses 114, 116 allow the pivot modules 114, 116 to better slide between the upper and lower walls 94, 96 of the module support 18 when rotating between the open (FIG. 19) and closed positions (FIG. 21).

IV. Summary and Conclusion

A telecommunications device in accordance with inventive principles disclosed herein includes a frame and a plurality of pivot modules mounted to the frame. The frame has a length that extends from a left end to a right end of the frame. The frame includes a left mounting bracket positioned at the left end of the frame and a right mounting bracket positioned at the right end of the frame. The frame also includes upper and lower portions that extend along the length of the frame. The pivot modules are mounted between the upper and lower portions of the frame and between the left and right ends of the frame. Each of the pivot modules include a front side at which a plurality of front connectors are located, and a rear side at which a plurality of rear connectors are located. The pivot modules are pivotally movable about generally upright pivot axes that extend between the upper and lower portions of the frame. The pivot axes is located adjacent one of the first and second ends of the pivot modules. Each pivot module has a height that extends between the upper and lower portions of the frame and a length that extends between the left and right ends of the frame. The lengths of the pivot modules are longer than the heights, and the lengths of the pivot modules are generally perpendicular relative to the pivot axes. The lengths of the pivot modules extend from first to second ends of the pivot modules.

Another telecommunications device in accordance with inventive principles disclosed herein includes a frame, a central support, and first and second pivot modules. The frame has a length that extends from a left end to a right end of the frame. The frame includes a left mounting bracket positioned at the left end of the frame and a right mounting bracket positioned at the right end of the frame. The frame also includes upper and lower portions that extend along the length of the frame. The central support projects forwardly from the frame at a central region located between the left and right ends of the frame. The first pivot module is mounted to the frame between the left end of the frame and the central support. The first pivot module includes a front side at which a plurality of front connectors are located and a rear side at which a plurality of rear connectors are located. The first pivot module has an outer end positioned adjacent the left mounting bracket and an inner end positioned adjacent the central support. The first pivot module is pivotally movable relative to the frame about a generally upright first pivot axes located adjacent the outer end of the first pivot module. The inner end of the first pivot module is supported by the central support. The second pivot module is mounted to the frame between the right end of the frame and the central support. The second pivot module includes a front side at which a plurality of front connectors are located and a rear side at which a plurality of rear connectors are located. The second pivot module has an outer end positioned adjacent the right mounting bracket and an inner end positioned adjacent the central support. The second pivot module is pivotally movable relative to the frame about a generally upright second pivot axes located adjacent the outer end of the second pivot module. The inner end of the second pivot module is supported by the central support. The first and second pivot modules are pivotally movable to an angled position in which the inner ends of the first and second pivot modules are forwardly offset from the frame and the first and second pivot modules define a generally v-shaped configuration.

The above specification provides a complete description of the invention. Since many embodiments of the invention can be made without departing from the spirit and scope of the invention, certain aspects of the invention reside in the claims hereinafter appended.

What is claimed is:

1. A telecommunications device comprising:
   a frame having a length that extends from a left end to a right end of the frame, the frame including a left mounting bracket positioned at the left end of the frame and a right mounting bracket positioned at the right end of the frame, the frame also including upper and lower portions that extend along the length of the frame;
   a central support that projects forwardly from the frame at a central region located between the left and right ends of the frame; and
   a plurality of pivot modules mounted between the upper and lower portions of the frame and between the left and right ends of the frame, each of the pivot modules including a front side at which a plurality of front connectors are located and a rear side at which a plurality of rear connectors are located, the pivot modules being pivotally movable about generally upright pivot axes that extend between the upper and lower portions of the frame, the pivot modules being pivotally movable between at least a closed position and an angled position, each pivot module having a height that extends between the upper and lower portions of the frame and a length that extends between the left and right ends of the frame, the lengths of the pivot modules being longer than the heights, the lengths of the pivot modules being generally perpendicular relative to the pivot axes, the lengths of the pivot modules extending from outer to inner ends of the pivot modules, the pivot axes being located adjacent the outer ends of the pivot modules, the inner ends of the pivot modules being supported by the central support when pivotally moved to the angled position, and the inner ends of the pivot modules being supported by the central support when pivotally moved to the closed position.

2. The telecommunications device of claim 1, wherein the pivot modules are each pivotally movable about the pivot axes between at least the angled and the closed positions, and wherein the telecommunications device has a latch arrangement for securing the pivot modules in at least the angled and the closed positions, the latch arrangement includes at least first and second latches, the first latch being positioned at the central support adjacent the frame and being adapted to engage the inner end of at least one of the pivot modules when the pivot module is in the closed position, the second latch being positioned at the central support at a location forwardly offset from the first latch, the second latch being adapted to engage the inner end of the at least one pivot module when the pivot module is in the angled position.

3. The telecommunications device of claim 1, further comprising a latch arrangement for securing the inner ends of the pivot modules to a first region of the central support when the pivot modules are in the closed position and for securing the inner ends of the pivot modules to a second region of the central support when the pivot modules are in the angled position, the second region being forwardly offset from the first region.

4. The telecommunications device of claim 1, wherein the left and right mounting brackets are adapted for securing the telecommunications device to a rack and include flanges that are generally co-planar and define fastener openings that extend through the flanges in a front-to-back direction.

5. The telecommunications device of claim 1, wherein the pivot modules are aligned along a line that extends from the first end to the second end of the frame.

6. The telecommunications device of claim 5, wherein only two of the pivot modules are mounted to the frame.

7. The telecommunications device of claim 1, wherein the front connectors include ports for receiving plugs.

8. The telecommunications device of claim 7, wherein the rear connectors include insulation displacement connectors.

9. The telecommunications device of claim 8, wherein the ports and the insulation displacement connectors are provided on jack modules secured to the pivot modules, wherein each jack module includes one of the ports and a plurality of the insulation displacement connectors.

10. A telecommunications device comprising:
    a frame having a length that extends from a left end to a right end of the frame, the frame including a left mounting bracket positioned at the left end of the frame and a right mounting bracket positioned at the right end of the frame, the frame also including upper and lower portions that extend along the length of the frame;
    a central support that projects forwardly from the frame at a central region located between the left and right ends of the frame;
    a first pivot module mounted to the frame between the left end of the frame and the central support, the first pivot module including a front side at which a plurality of front connectors are located and a rear side at which a plurality of rear connectors are located, the first pivot module having an outer end positioned adjacent the left mounting bracket and an inner end positioned adjacent the central support, and the first pivot module being pivotally movable relative to the frame about a generally upright first pivot axis located adjacent the outer end of the first pivot module;
    a second pivot module mounted to the frame between the right end of the frame and the central support, the second pivot module including a front side at which a plurality of front connectors are located and a rear side at which a plurality of rear connectors are located, the second pivot module having an outer end positioned adjacent the right mounting bracket and an inner end positioned adjacent the central support, and the second pivot module being pivotally movable relative to the frame about a generally upright second pivot axis located adjacent the outer end of the second pivot module;
    the first and second pivot modules being pivotally movable to an angled position in which the inner ends of the first and second pivot modules are forwardly offset from the frame and the front sides of the first and second pivot modules define a generally v-shaped configuration, the inner ends of the first and second pivot modules being supported by the central support when the first and second pivot modules are in the generally v-shaped configuration; and
    the first and second pivot modules being pivotally movable to a closed position in which the inner ends of the first and second pivot modules are positioned adjacent to the frame, the inner ends of the first and second pivot modules being supported by the central support when the first and second pivot modules are in the closed position.

11. The telecommunications device of claim 10, wherein the front connectors are aligned along lines that extend generally radially outwardly from the pivot axes.

12. The telecommunications device of claim 10, where the first and second pivot modules each include two horizontal rows of the front connectors, the rows of the front connectors being aligned along lines that extend radially outwardly from the pivot axes.

13. The telecommunications device of claim 10, wherein at least some of the front connectors of the first pivot module are offset different distances from the first pivot axis, and at least some of the front connectors of the second pivot module are offset different distances from the second pivot axis.

14. The telecommunications device of claim 10, wherein the front connectors of the first pivot module are offset at progressively greater radial distances from the first pivot axis, and the front connectors of the second pivot module are offset at progressively greater radial distances from the second pivot axis.

15. The telecommunications device of claim 10, wherein all of the front connectors of the first pivot module are offset to the right of the first pivot axis, and all of the front connectors of the second pivot module are offset to the left of the second pivot axis.

16. The telecommunications device of claim 10, wherein the first and second pivot modules can be pivoted to open positions in which the inner ends of the pivot modules are moved forwardly past the central support.

17. The telecommunications device of claim 16, wherein the central support includes a nose piece that can be removed to allow the first and second pivot modules to be pivoted forwardly past the central support to the open positions.

18. The telecommunications device of claim 10, wherein the front sides of the first and second pivot modules are generally co-planar when the first and second pivot modules are in the closed position.

19. The telecommunications device of claim 18, wherein latches are provided at the central support for securing the first and second pivot modules in the angled and the closed positions.

20. The telecommunications device of claim 19, wherein the central support includes upper and lower tracks for guiding the inner ends of the first and second pivot modules as the first and second pivot modules are moved between the angled and the closed positions.

* * * * *

UNITED STATES PATENT AND TRADEMARK OFFICE
CERTIFICATE OF CORRECTION

PATENT NO. : 7,357,667 B2  Page 1 of 1
APPLICATION NO. : 11/472816
DATED : April 15, 2008
INVENTOR(S) : Clark et al.

It is certified that error appears in the above-identified patent and that said Letters Patent is hereby corrected as shown below:

Col. 5, line 13: "rotation a (see FIG. 2)" should read --rotation $\alpha$ (see FIG. 2)--

Signed and Sealed this

Fifth Day of January, 2010

David J. Kappos
*Director of the United States Patent and Trademark Office*